United States Patent
Takashima

(10) Patent No.: US 7,536,420 B2
(45) Date of Patent: May 19, 2009

(54) INFORMATION PROCESSING APPARATUS AND METHOD, INFORMATION RECORDING MEDIUM, AND COMPUTER PROGRAM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 11/600,377

(22) Filed: Nov. 16, 2006

(65) Prior Publication Data

US 2007/0136282 A1 Jun. 14, 2007

(30) Foreign Application Priority Data

Nov. 25, 2005 (JP) ............................. 2005-340823

(51) Int. Cl.
*G06F 17/30* (2006.01)
(52) U.S. Cl. .................... 707/200; 707/204; 707/205
(58) Field of Classification Search ................ 707/200, 707/204, 205
See application file for complete search history.

(56) References Cited

U.S. PATENT DOCUMENTS

| | | | | |
|---|---|---|---|---|
| 5,530,939 A * | 6/1996 | Mansfield et al. | ........... | 707/201 |
| 5,987,477 A * | 11/1999 | Schmuck et al. | ........... | 707/201 |
| 6,609,128 B1 * | 8/2003 | Underwood | .................. | 707/10 |
| 7,362,862 B2 * | 4/2008 | Schneier et al. | ............. | 380/251 |
| 2003/0005301 A1 * | 1/2003 | Jutzi et al. | .................. | 713/176 |
| 2003/0037068 A1 * | 2/2003 | Thomas et al. | ............. | 707/200 |
| 2003/0093678 A1 * | 5/2003 | Bowe et al. | ................. | 713/180 |
| 2003/0182316 A1 * | 9/2003 | Johnson | ...................... | 707/200 |
| 2004/0034667 A1 * | 2/2004 | Sauvage et al. | ............. | 707/200 |
| 2004/0049648 A1 * | 3/2004 | Sato et al. | .................... | 711/164 |
| 2004/0143609 A1 * | 7/2004 | Gardner et al. | .............. | 707/204 |
| 2005/0015410 A1 * | 1/2005 | Sato | ........................... | 707/200 |
| 2005/0027757 A1 * | 2/2005 | Kiessig et al. | ............... | 707/204 |
| 2005/0149580 A1 * | 7/2005 | Hattori et al. | ................ | 707/200 |
| 2005/0246393 A1 * | 11/2005 | Coates et al. | ............... | 707/200 |
| 2007/0136282 A1 * | 6/2007 | Takashima | ..................... | 707/6 |
| 2007/0172199 A1 * | 7/2007 | Kobayashi et al. | ............ | 386/95 |

FOREIGN PATENT DOCUMENTS

| | | |
|---|---|---|
| JP | 2002-311967 | 10/2002 |
| JP | 2003-140662 | 5/2003 |
| JP | 2005-092830 | 4/2005 |
| WO | WO 2005/050528 A2 | 6/2005 |

\* cited by examiner

*Primary Examiner*—Don Wong
*Assistant Examiner*—Kim T Nguyen
(74) *Attorney, Agent, or Firm*—Wolf, Greenfield & Sacks, P.C.

(57) ABSTRACT

An information processing apparatus includes a data processor configured to obtain first content stored in a first information recording medium and second content which is stored in a second information recording medium and which is usable together with the first content, and to perform content playback processing by using the first content and the second content. The data processor calculates a hash value of a certificate stored in the first information recording medium, and verifies the calculated hash value against a hash value stored in a content certificate corresponding to the first content, and on the condition that the calculated hash value and the hash value stored in the content certificate coincide with each other, the data processor performs the content playback processing by using the first content and the second content.

13 Claims, 32 Drawing Sheets

FIG. 19

| [LOCAL STORAGE FILE NAME] | [STUDIO ID] | [PACKAGE ID] | [CONVERTED FILE NAME] |
|---|---|---|---|
| studioA.STREAM.00001.m2ts | 1 | 1, 2, 3 | BDMV/STREAM/00001.m2ts |
| studioA.CLIPINF.00001.clpi | 1 | 1, 2, 3 | BDMV/CLIPINF/00001.clpi |
| studioB.STREAM.01001.m2ts | 1, 2, 5 | (ALL) | BDMV/STREAM/01001.m2ts |
| studioB.CLIPINF.01001.clpi | 1, 2, 5 | (ALL) | BDMV/CLIPINF/01001.clpi |
| studioC.STREAM.00002.m2ts | 1 | 1, 2, 3 | BDMV/STREAM/00002.m2ts |
| studioC.STREAM.00002.m2ts | 2 | 4, 5, 6 | BDMV/STREAM/00012.m2ts |
| studioD.jimaku.dat | 1 | 1, 2, 3 | BDMV/STREAM/00099.m2ts |

FIG. 24

CONTENT CERTIFICATE

| HEADER AND OTHER REGISTERED DATA |
|---|
| |
| CONTENT HASH TABLE DIGEST |
| ⋮ |
| CONTENT HASH TABLE DIGEST |
| ROOT CERTIFICATE HASH |
| |
| SIGNATURE |

FIG. 26

| FIELD | |
|---|---|
| File ID character string = "BDID" | 32 bits |
| Version number = "0100" | 32 bits |
| Reserved | 256 bits |
| Organization_ID (Studio ID) | 32 bits |
| Disc_ID (Package ID) | 128 bits |
| Reserved | 352 bits | tent"), such as audio data, e.g., music, image data, e.g., mov-
INFORMATION PROCESSING APPARATUS AND METHOD, INFORMATION RECORDING MEDIUM, AND COMPUTER PROGRAM

CROSS REFERENCES TO RELATED APPLICATIONS

The present invention contains subject matter related to Japanese Patent Application JP 2005-340823 filed in the Japanese Patent Office on Nov. 25, 2005, the entire contents of which are incorporated herein by reference.

BACKGROUND OF THE INVENTION

1. Field of the Invention

The present invention relates to information processing apparatuses and methods, information recording media, and computer programs. More particularly, the invention relates to an information processing apparatus and method, an information recording medium, and a computer program that implement strict usage control for content stored in an information recording medium, such as a digital versatile disc (DVD) and content stored in a local storage, such as a hard disk, when the two types of content are simultaneously played back.

2. Description of the Related Art

Various software data (hereinafter referred to as "content"), such as audio data, e.g., music, image data, e.g., movies, game programs, and various application programs, can be stored on recording media, for example, Blu-ray discs™ using blue laser light, digital versatile discs (DVDs), mini discs (MDs), compact discs (CDs), as digital data. In particular, Blu-ray discs using blue laser light are high-density recording discs and can record a large volume of video content as high-quality image data.

Digital content is stored in various information recording media, such as those described above, and is provided to users. A user uses the digital content by playing it back on a user's personal computer (PC) or player, such as a disc player.

Generally, the distribution rights of many content data, such as music data and image data, are owned by creators or sellers of such content data. Basically, therefore, certain usage restrictions are imposed when distributing content, that is, the use of content is allowed only for authorized users, thereby preventing unauthorized copying.

According to digital recording apparatuses and recording media, images and sound can be repeatedly recorded and played back without a loss in quality. Thus, the distribution of illegally copied content via the Internet, the circulation of recording media, such as compact disc recordable (CD-R) discs, recording copied content thereon, so-called "pirated discs", the use of copied content stored in hard disks of, for example, PCs, are widespread.

DVDs or large-capacity recording media, such as those using blue laser light which have recently been developed, can record a large volume of data, for example, up to several movies, on one medium, as digital information. Since video information can be recorded as digital information as described above, it is becoming important to perform copyright protection by preventing unauthorized copying. Nowadays, to prevent unauthorized copying of digital data, various techniques for preventing unauthorized copying are practically applied to digital recording apparatuses or recording media.

For example, in DVD players, a content scrambling system is employed. According to the content scrambling system, data, such as, video data or sound data, is encrypted and recorded on, for example, a digital versatile disc read only memory (DVD-ROM), and a key for decrypting the encrypted data is supplied to licensed DVD players. A license is given to DVD players that are designed in compliance with predetermined operation rules, for example, agreeing not to perform unauthorized copying. Accordingly, licensed DVD players can decrypt data recorded on a DVD-ROM by using the given key to play back images or sound from the DVD-ROM.

On the other hand, unlicensed DVD players are unable to play back data recorded on the DVD-ROM since they do not have the key for decrypting the encrypted data. In this manner, in the content scrambling system, DVD players that do not satisfy conditions demanded for receiving a license are unable to play back digital data from a DVD-ROM, thereby preventing unauthorized copying.

A management system for content stored in information recording media is constructed, as described above. Another type of system that allows users to easily download content, such as effect sound, moving pictures, and still images, that can serve as materials for video products is disclosed in Japanese Unexamined Patent Application Publication No. 2003-140662. Additionally, a technique for substituting data indicating part of a piece of music with another data is disclosed in Japanese Unexamined Patent Application Publication No. 2002-311967. It is however difficult to implement the secure data management or usage management for data generated by executing programs stored in information recording media by users or data or content obtained from external servers.

To perform the secure management for data generated by executing programs stored in information recording media by users or data obtained from external servers, it is necessary to handle individual data by, for example, setting a password for each data by a user input or by encrypting each data by using a cryptographic key obtained from an external source. In this data management structure, however, if the number of data generated or obtained by users afterwards is increased, the number of cryptographic keys or passwords is also increased. Additionally, the location of data becomes unclear and the correspondence between stored data and the cryptographic keys or passwords also becomes unclear. Sufficient measures have not yet been taken for the usage management for such subsequently generated/obtained data.

In particular, in an environment where various application programs can be run, such as in a PC, generally, directories managed by a general-purpose file system are set, and files generated by the corresponding programs can be accessed from various applications. Accordingly, it is preferable that, as well as normal files, subsequently generated/obtained data that should be managed by the content management system be also set in management directories of the general-purpose file system. In this case, however, if special settings are not made, the subsequently generated/obtained data is accessed from various application programs, which cause the unauthorized use or tampering of the data.

There are various types of subsequently generated/obtained data, such as data used in accordance with content stored in a specific information recording medium, data that can be used in common for content provided by a specific studio, which serves as a content providing entity, and data that can be used in common for content provided by various studios. It is necessary to perform usage control in accordance with the type of subsequently generated/obtained data. In a current system, however, it is difficult to perform usage control in accordance with the type of subsequently generated/obtained data. Japanese Unexamined Patent Application Publication No. 2005-92830 discloses a content usage system in which a certain file is encrypted with a key file different from a unit key used for encrypting content data. The above publication, however, merely discloses that another key is used for encrypting an application execution file without content real data therein, and assigning a key to a certain type content that has to be simultaneously played back with another type of content is not disclosed. Additionally, it can be considered that a virtual file system is constructed for playing back content recorded on a first recording medium, such as an optical disc, and content recorded on a second recording medium, such as a hard disk. In this case, it is desirable that suitable management of the two types of content be performed. The virtual file system is disclosed in, for example, WO2005/050528.

SUMMARY OF THE INVENTION

It is thus desirable to provide an information processing apparatus and method, an information recording medium, and a computer program that implement strict usage control for content stored in an information recording medium, such as a DVD, and content stored in a local storage, such as a hard disk, when the two types of content are simultaneously played back.

According to an embodiment of the present invention, there is provided an information processing apparatus including a data processor configured to obtain first content stored in a first information recording medium and second content which is stored in a second information recording medium and which is usable together with the first content, and to perform content playback processing by using the first content and the second content. The data processor calculates a hash value of a certificate stored in the first information recording medium, and verifies the calculated hash value against a hash value stored in a content certificate corresponding to the first content, and on the condition that the calculated hash value and the hash value stored in the content certificate coincide with each other, the data processor performs the content playback processing by using the first content and the second content.

The data processor may verify a signature attached to the content certificate, and on the condition that the integrity of the content certificate is verified on the basis of the signature, the data processor may obtain the hash value stored in the content certificate to verify the calculated hash value against the obtained hash value.

The data processor may obtain a public key certificate as the certificate stored in the first information recording medium, and calculates the hash value of the public key certificate to verify the calculated hash value against the hash value stored in the content certificate corresponding to the first content, and on the condition that the calculated hash value and the stored hash value coincide with each other, the data processor performs the content playback processing.

The public key certificate may store a public key for verifying a signature set in the first content stored in the first information recording medium.

The data processor may further obtain identification information set in the first information recording medium or in the first content, and obtains, as the second content, content that is usable in association with the identification information from the second information recording medium to perform the content playback processing by using the first content and the second content.

The identification information may include at least one of a studio ID, which serves as identification information concerning a production entity of the first content stored in the first information recording medium, and a disc ID, which serves as identification information concerning the first information recording medium.

The data processor may construct a virtual file system when performing the playback processing by using the first content and the second content, and the identification information is recorded, as a single file, in a directory in the first information recording medium which is not combined when constructing the virtual file system, and the recorded identification information is obtained from the first recording medium.

The data processor may verify a tamper-checking signature set in association with the identification information to verify the integrity of a data file of the identification information.

According to another embodiment of the present invention, there is provided an information recording medium including encrypted content, a public key certificate, and a content certificate in which certificate data that certifies the integrity of the encrypted content and a hash value of the public key certificate are stored.

The content certificate may store a hash value based on data forming the encrypted content.

The public key certificate may store therein a public key for verifying a signature set in the encrypted content.

According to another embodiment of the present invention, there is provided an information processing method for an information processing apparatus. The information processing method includes the steps of calculating a hash value of a certificate stored in a first information recording medium and verifying the calculated hash value against a hash value stored in a content certificate corresponding to first content stored in the first information recording medium, and on the condition that the calculated hash value and the hash value stored in the content certificate coincide with each other, obtaining the first content stored in the first information recording medium and second content which is stored in a second information recording medium and which is usable together with the first content, and performing content playback processing by using the first content and the second content.

When verifying the calculated hash value against the stored hash value, a signature attached to the content certificate may be verified, and on the condition that the integrity of the content certificate is verified on the basis of the signature, the hash value stored in the content certificate may be obtained, and the calculated hash value may be verified against the obtained hash value.

When verifying the calculated hash value against the stored hash value, a public key certificate may be obtained as the certificate stored in the first information recording medium, and the hash value of the public key certificate may be calculated, and the calculated hash value may be verified against the hash value stored in the content certificate corresponding to the first content.

The public key certificate may store a public key for verifying a signature set in the first content stored in the first information recording medium.

When performing the content playback processing, identification information set in the first information recording medium or in the first content may be obtained from the first information recording medium, and content that is usable in association with the identification information may be obtained as the second content from the second information recording medium so that the content playback processing is performed by using the first content and the second content.

The identification information may include at least one of a studio ID, which serves as identification information concerning a production entity of the first content stored in the first information recording medium, and a disc ID, which serves as identification information concerning the first information recording medium.

The information processing method may further include the step of verifying a tamper-checking signature set in association with the identification information to verify the integrity of a data file of the identification information.

According to another embodiment of the present invention, there is provided a computer program that allows an information processing apparatus to perform content playback control processing including the steps of calculating a hash value of a certificate stored in a first information recording medium and verifying the calculated hash value against a hash value stored in a content certificate corresponding to first content stored in the first information recording medium, and on the condition that the calculated hash value and the hash value stored in the content certificate coincide with each other, obtaining the first content stored in the first information recording medium and second content which is stored in a second information recording medium and which is usable together with the first content, and performing content playback processing by using the first content and the second content.

The above-described computer program is a computer program that can be provided in the form of a computer-readable storage medium, for example, a recording medium, such as a DVD, CD, or a MO, or a communication medium, such as a network, to a computer system that can execute various program codes. Such a program is provided in a computer-readable format so that processing can be executed in the computer system in accordance with the program.

Further features and advantages of the present invention will become apparent from the following description of an exemplary embodiment with reference to the attached drawings.

According to an embodiment of the present invention, the following advantages can be achieved. When simultaneously playing back first content stored in a first information recording medium, such as a DVD, and second content stored in a second information recording medium, such as a hard disk, a hash value of a certificate stored in the first information recording medium is calculated, and then, the calculated hash value is checked against a hash value registered in a content certificate corresponding to the first content stored in the first information recording medium. On the condition that the two hash values coincide with each other, content playback processing is permitted. As a result, more strict content usage control can be implemented compared with usage control based on only ID information, such as a studio ID and a package ID.

BRIEF DESCRIPTION OF THE DRAWINGS

FIG. 19 illustrates an example of a file conversion table stored in subsequently generated/obtained data search information;

FIG. 24 illustrates the data structure of a content certificate;

FIG. 26 illustrates the data structure of ID information;

DESCRIPTION OF THE PREFERRED EMBODIMENTS

Figure 1:
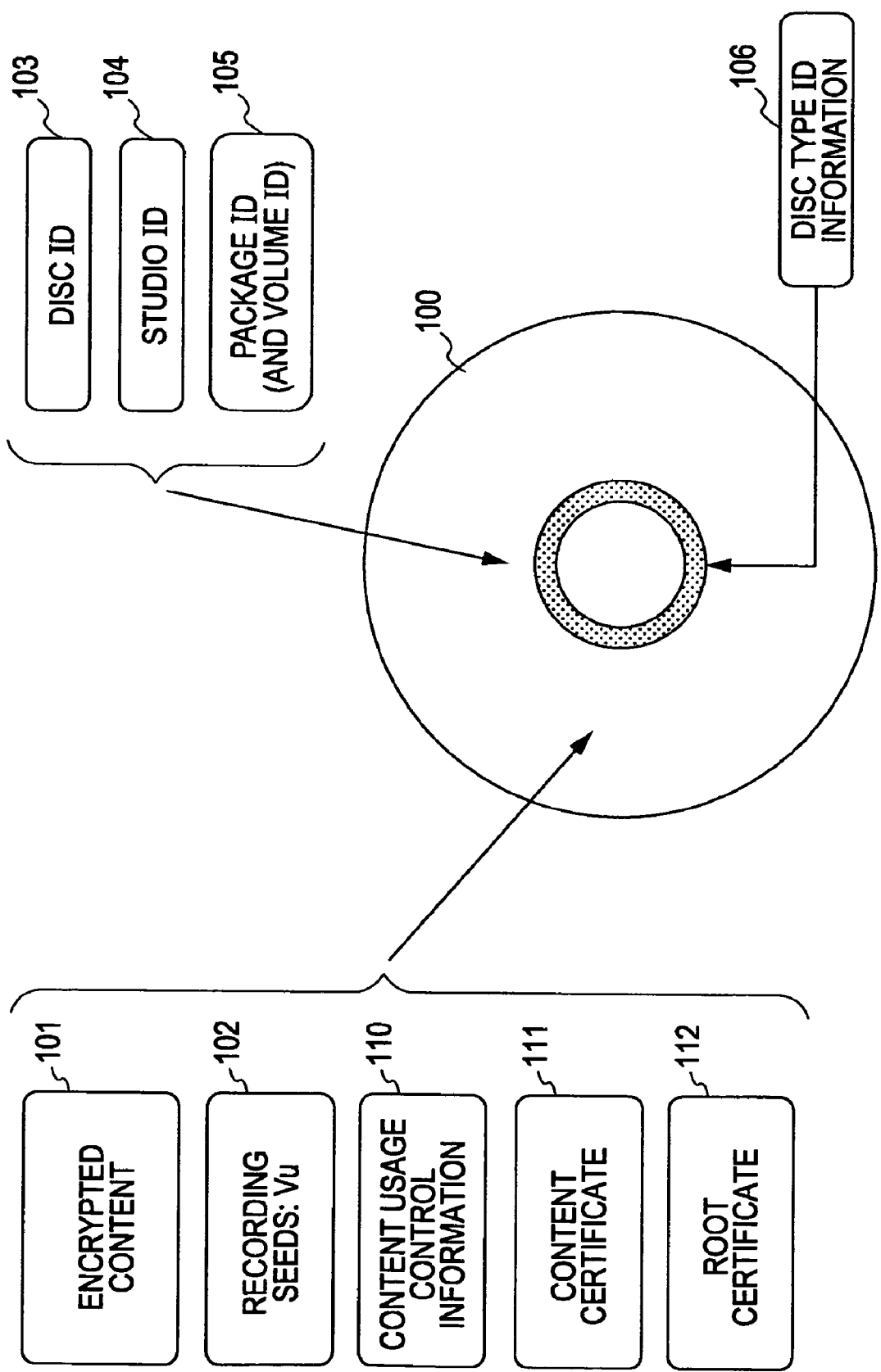
FIG. 1 illustrates the structure of data stored in an information recording medium.

Details of an information processing apparatus and method, a recording medium, and a computer program according to an embodiment of the present invention are described below in the order of the following sections with reference to the accompanying drawings.

1. Storage Data in Information Recording Medium
2. Content Storage Structure
3. Encryption and Usage Management of Storage Data
4. Management Structure for Subsequently Generated/Obtained Data
5. Association of CPS Unit Data Stored in Information Recording Medium with CPS Unit Data Stored Outside Information Recording Medium
6. Usage Control for Subsequently Generated/Obtained Data
7. Content Usage Control Based on Strict Verification Processing
8. Example of Configuration of Information Processing Apparatus 1. Storage Data in Information Recording Medium The information processing apparatus according to an embodiment of the present invention implements unit-based usage control for content stored in an information recording medium, such as a DVD, and also for data subsequently generated or obtained by a user, such as downloaded data, (hereinafter sometimes referred to as "subsequently generated/obtained data") stored in a local storage, for example, a hard disk. An example of storage data in an information recording medium 100, such as a DVD, storing content therein is discussed below with reference to FIG. 1.

The information recording medium 100 is a medium storing authorized content and is manufactured in a disc manufacturing factory with the permission of a so-called "content right holder" having an authorized content copyright or distribution right. In the following embodiment, the information recording medium 100 is discussed in the context of a disc medium. However, various information recording media may be used in the present invention.

The information recording medium 100 may be a write-once ROM disc, a partial ROM that allows data to be written into only part of the partial ROM, or an all disc that allows data to be written into the whole area.

In the information recording medium 100, content 101, such as audiovisual (AV) streams of moving picture content, for example, high definition (HD) movie content, which is HD image data, game programs, image files, sound data, or text data, defined by specific standards is stored. The content 101 includes various modes of information, such as content information that can be used only by data from the information recording medium 100, and content information that can be used by a combination of the data from the information recording medium 100 and data provided from a server connected to the recording medium 100 via a network.

At least part of the content 101 stored in the information recording medium 100 is encrypted, and recording seeds (REC SEED) Vu 102, which serve as information necessary for generating keys for decrypting the encrypted data, are also stored in the information recording medium 100. Before being stored in the information recording medium 100, for the content usage management, the content is encrypted by unit keys as individual cryptographic keys. The recording seeds 102 are key generation information for generating individual unit keys. Instead of being stored in the information recording medium 100, the recording seeds 102 may be obtained from a server connected to the information recording medium 100.

In the information recording medium 100, content usage control information (CCI) 110 including copy control information and playback control information concerning the content 101 is stored. When using the content 101, the information processing apparatus obtains the content usage control information (CCI) 110 corresponding to the content 101 and uses the content 101 in accordance with the control information indicated in the content usage control information (CCI) 110.

In the information recording medium 100, a content certificate 111 corresponding to the content 101 is also stored. In the content certificate 111, data generated based on data forming the content 101, for example, a hash value, is stored and are used for verifying the integrity of the content 101. In the content certificate 111, data based on a root certificate 112, for example, a hash value of the root certificate 112, used for determining whether content can be used when content playback processing, which is discussed below, is performed, and more specifically, when content stored in an information recording medium and content stored in a local storage are simultaneously played back. Details of the configuration and usage processing of the content certificate 111 are discussed below.

The above-described root certificate 112 is stored in the information recording medium 100. The root certificate 112 is a public key certificate issued by, for example, a third party organization, and stores a signature-verifying public key set for the content 101. Details of the usage processing of the root certificate 112 are discussed below.

The information recording medium 100 also stores a disc ID 103 as identification information for the information recording medium 100, a studio ID 104 as an identifier of an editing studio that edits the content 101 stored in the information recording medium 100, a package ID 105 as a package identifier, which serves as the manufacturing unit of the information recording medium 100, and disc type identification information 106. In addition to the package ID 105, a volume ID as a volume identifier indicating a different manufacturing unit of the information recording medium 100 may be stored.

Content to be stored in the information recording medium 100 includes AV streams of moving picture content, for example, HD movie content, which is HD image data, game programs, image files, sound data, and text data defined by specific standards. If the information recording medium 100 is a Blu-ray disc (trademark), which is a high-density data recording disc using blue laser light, data based on the Blu-ray ROM standard format is stored as main content.

Data having a data format which is not compliant with a specific AV data format, such as game programs, image files, sound data, or text data, which serve as service data, may be stored as sub-content.

For the content usage management, various items of the content 101 are stored in the information recording medium 100 by being encrypted with the corresponding unit keys. The recording seeds 102 are used as the key generating information for generating the unit keys.

More specifically, various items of the content 101, such as AV streams, music data, image data, for example, moving pictures and still images, game programs, and web content, are divided into units as content usage management units, and the different recording seeds 102 are assigned to the corresponding divided units to generate unit keys based on the recording seeds. The encrypted content is then decrypted by using the unit keys so that it can be played back.

For example, to use the content 101, such as AV streams, stored in the information recording medium 100, a predetermined cryptographic key generating sequence using the recording seed 102 and other private information (not shown), such as physical indexes, recorded on the information recording medium 100, can be executed so that the unit key associated with the unit can be obtained, and then, the encrypted content contained in the unit is decrypted based on the obtained unit key.

Figure 2:
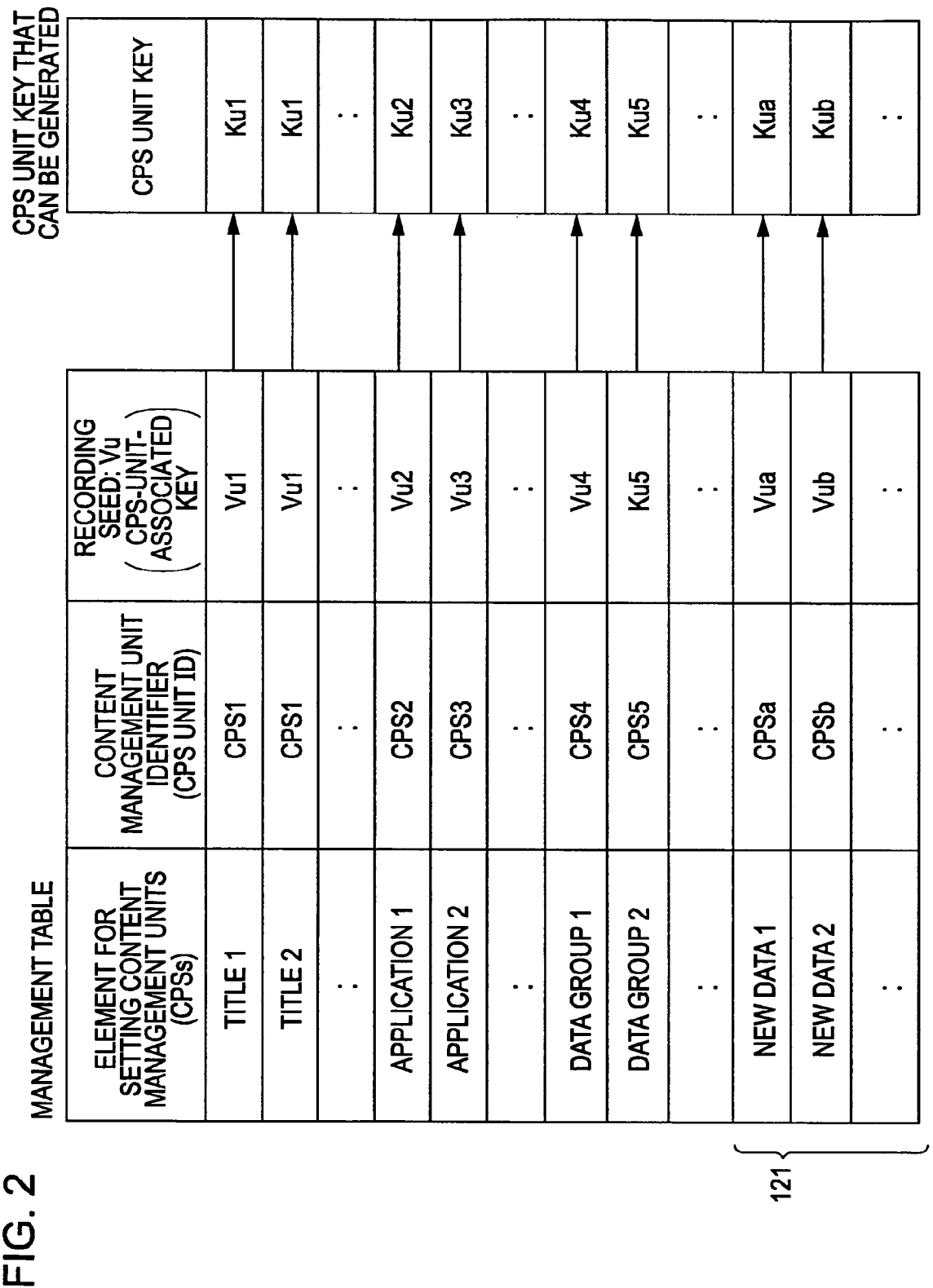
FIG. 2 illustrates an example of a content protection system (CPS) unit management table.

As stated above, various items of the encrypted content 101 stored in the information recording medium 100 are divided into units, which serve as units for content usage management, which are referred to as "content protection system (CPS) units" (content management units). The correspondence between the CPS unit structure and the recording seeds is shown in FIG. 2 by way of example. More specifically, FIG. 2 illustrates the correspondence between a CPS unit management table, which is content management information, stored in the information recording medium 100, and CPS unit keys that can be generated based on the recording seeds associated with the individual CPS units.

The CPS unit management table shown in FIG. 2 shows that elements forming CPS units include titles, applications, and data groups of content, and that CPS unit IDs, which serve as identifiers for the CPS units, and recording seed information for the CPS units are associated with the CPS units.

In FIG. 2, title 1 is set as CPS unit 1 in association with recording seed Vu1. Title 2 is also set as CPS unit 1 in association with recording seed Vu1. Application 1 is set as CPS unit 2 in association with recording seed Vu2.

For example, unit key Ku1 is generated based on the recording seed Vu1, and encrypted content contained in the CPS unit 1 (CPS1) that can be identified by title 1 and title 2 can be decrypted with the unit key Ku1. Similarly, unit key Ku2 is generated based on the recording seed Vu2, and encrypted content contained in the CPS unit 2 (CPS2) that can be identified by application 1 can be decrypted with the unit key Ku2. The same applies to the rest of the unit keys.

The CPS unit management table includes, not only CPS units for content stored in the information recording medium 100, but also CPS units corresponding to a new data field 121 in FIG. 2 for subsequently generated/obtained data, such as data generated by a user or obtained from an external source. Users can define the CPS units for subsequently generated/obtained data.

The CPS units can be set as management units for subsequently generated/obtained data, such as data obtained by executing content, for example, programs, stored in the information recording medium 100. More specifically, the subsequently generated/obtained data includes information concerning a game in progress or concerning the score of a game, or sub-data associated with AV streams stored in the information recording medium 100, for example, subtitle data obtained from an external server. Details of the usage modes of the CPS units for subsequently generated/obtained data are discussed below.

2. Content Storage Structure

The format of content stored in an information recording medium is described below with reference to FIG. 3.

Figure 3:
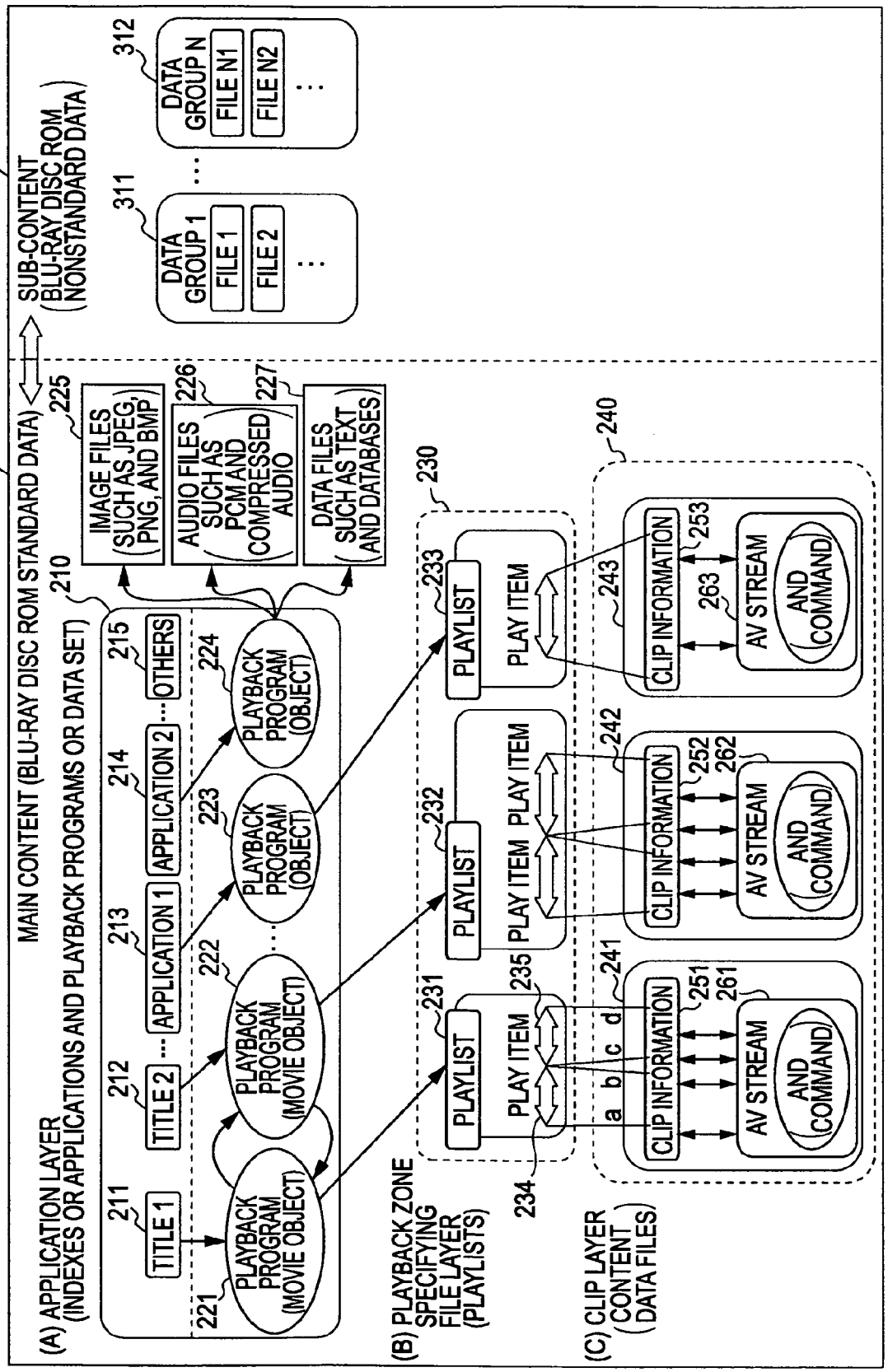
FIG. 3 illustrates an example of the setting of content management units from content stored in an information recording medium.

In an information recording medium, as shown in FIG. 3, AV streams of motion picture content, such as HD movie content, which is HD image data, are stored as main content 200, and other data and programs, such as game programs, images files, music data, and text data, which serve as service data, are stored as sub-content 300.

The main content 200 is stored according to a specific AV format, for example, the Blu-ray disc ROM standard format, as the Blu-ray disc ROM data. The sub-content 300 is stored according to a certain format that does not conform to the Blu-ray disc ROM standard format as the Blu-ray disc ROM nonstandard data.

FIG. 3 shows that the main content 200 based on the Blu-ray disc ROM standard format includes moving picture data (AV streams) as real content to be played back, and has a hierarchical structure according to the Blu-ray disc ROM standard format, i.e., an application layer 210 indicated by (A) in FIG. 3, a playback zone specifying file layer (playlists) 230 indicated by (B), and a clip layer (content data files) 240 indicated by (C).

The clip layer 240 includes clips 241, 242, and 243, which are divided content data files. The clips 241, 242, and 243 include AV stream files 261, 262, and 263, respectively, and clip information files 251, 252, and 253, respectively.

The clip information file 251 is a data file storing attribute information concerning the AV stream file 261. The AV stream file 261 is, for example, moving picture experts group transport stream (MPEG-TS) data, and has a data structure in which various items of information concerning images (video), audio, subtitle data, etc. are multiplexed. Command information for controlling a playback apparatus during a playback operation may also be multiplexed in the AV stream file 261.

The playback zone specifying file layer (playlist layer) 230 includes a plurality of playback zone specifying files (playlists) 231, 232, and 233. Each of the playlists 231, 232, and 233 selects one of the plurality of AV stream data files contained in the clip layer 240, and has at least one play item that specifies a specific data portion of the selected AV stream data file as the playback start point and the playback end point. If one of the playlists 231, 232, and 233 is selected, the playback sequence can be determined according to the play item contained in the selected playlist so that a playback operation is started.

For example, it is now assumed that the playlist 231 is selected. In this case, the play item 234 associated with the playlist 231 has playback start point a and playback end point b in the clip 241, and the play item 235 has playback start point c and playback end point d in the clip 241. Accordingly, specific data areas from a to b and from c to d of the AV stream data file 261 contained in the clip 241 are played back.

The application layer 210 is set as a layer having a combination of an application index file 211 or 212 including a content title to be displayed on a display unit used for playing back content and a playback program 221 or 222, or a combination of an application execution file 213, 214, or 215, such as game content or web content, and a playback program 223 or 224. The user can determine content to be played back by selecting the title contained in the application index file 211 or 212.

Each title is associated with the corresponding playback program 221, 222, 223, or 224, for example, a movie object, as shown in FIG. 3, and when the user selects one of the titles, playback processing is started based on the playback program associated with the selected title. The application index file 211 or 212 indicated by title 1 or title 2, respectively, includes a title presenting program for displaying a title and a menu of content that is automatically played back when an information recording medium is set or operated.

The application index file 211 or 212 or the application execution file 213 or 214 may include an application resource file used for running an application. Alternatively, various data files that can be obtained from an information recording medium or a network connecting server, such as image files 225 based on, for example, joint picture experts group (JPEG), portable network graphics (PNG), or bitmap (BMP), audio files 226 based on, for example, pulse code modulation (PCM) or compressed audio, and data files 227 for text and databases, may be used as the application resource files.

The playback programs (for example, movie objects) 221 through 224 are content playback processing programs that can specify playback zone specifying files (playlists), and that can also provide functions necessary for presenting playback content (HD movie content) in a programmable manner, such as functions of responding to operation information concerning content playback processing input from a user, jumping between titles, and branching the playback sequence. The playback programs 221 through 224 can be jumped from one another, and the playback program to be executed is selected by the user or according to a preset program, and the playback content can be selected and played back from the clip 241, 242, or 243 through the playlist 231, 232, or 233 designated by the selected playback program.

The main content 200 is managed, as shown in FIG. 3, as, for example, the Blu-ray disc ROM data, according to a hierarchical structure based on the Blu-ray disc ROM standard format. In this hierarchical structure, content management units (CPS units) are set, and the content usage is managed on the basis of the content management units (CPS units). Details of the content management units (CPS units) are discussed below.

In the information recording medium, the sub-content 300 is stored together with the main content 200. The sub-content 300 is content stored in, such as a format that does not conform to a specific AV format, for example, the Blu-ray disc ROM standard format.

The sub-content 300 includes game programs, image files, sound data, and text data, which serve as service data, and a set of a plurality of data files are defined as a data group.

The sub-content 300 shown in FIG. 3 includes a data group-1 311 through a data group-N 312. Each of the data groups can be set as a content management unit (CPS unit), in which case, the content usage is managed in units of data groups.

3. Encryption and Usage Management of Storage Data

Figure 4:
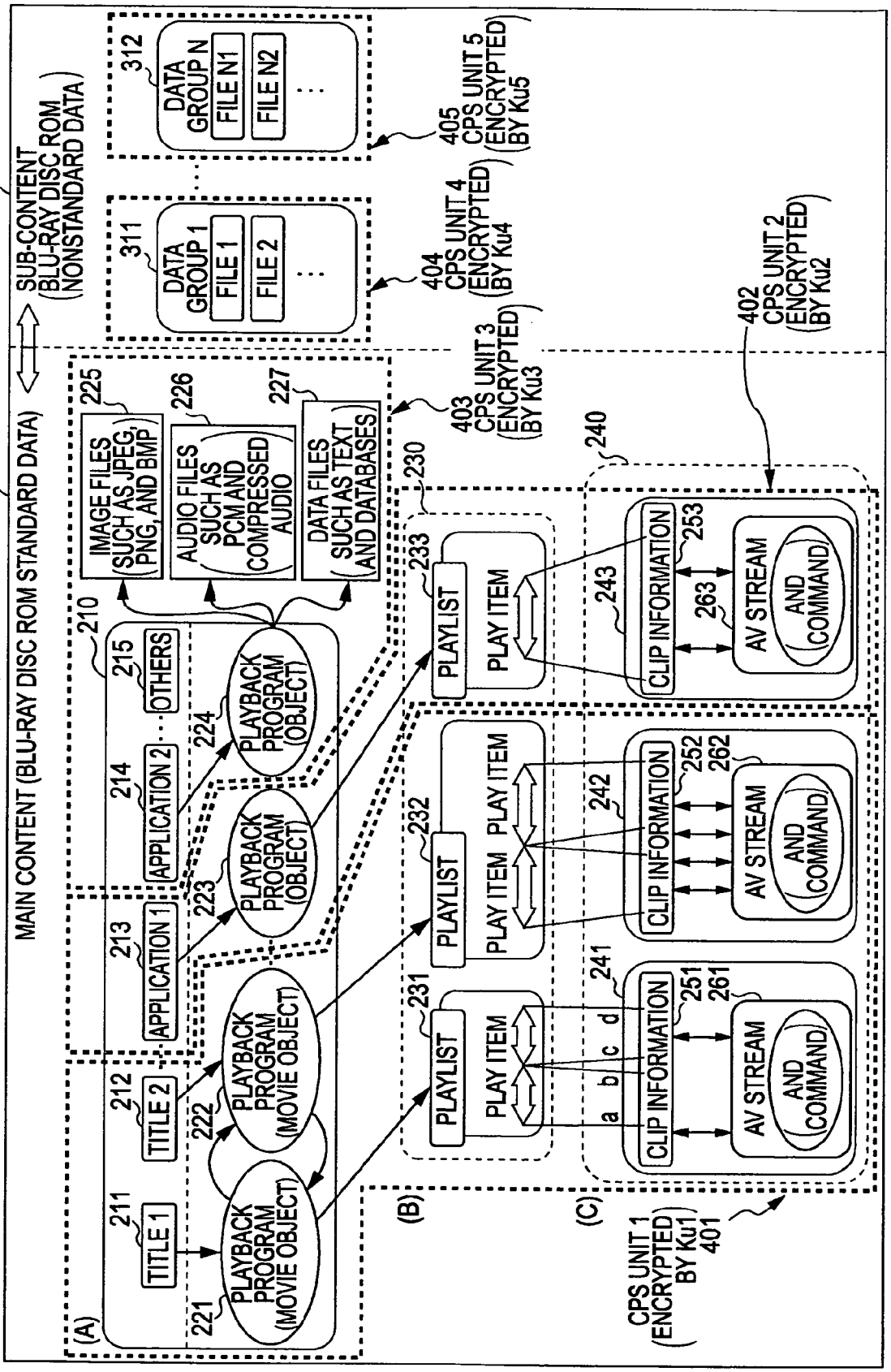
FIG. 4 illustrates an example of the encryption of content management units set for content stored in an information recording medium.

A description is now given, with reference to, for example, FIG. 4, of a content management structure in which different types of usage control can be performed on individual content management units (CPS units) divided from content stored in an information recording medium.

As discussed with reference to FIG. 2, unit keys are assigned to individual content management units (CPS units) as different cryptographic keys. In other words, one unit key is assigned to each content management unit (CPS unit). The unit keys can be generated based on recording seeds corresponding to the associated CPS units.

Content belonging to each CPS unit is encrypted with the corresponding unit key, and when playing back the content, the unit key assigned to the CPS unit is obtained to decrypt the content. The unit keys can be independently obtained and managed. For example, the unit key assigned to unit A can be set as a key that is obtained from an information recording medium. The unit key assigned to unit B can be set as a key that is obtained by accessing a network-connected server and by conducting predetermined procedures by the user.

An example of the setting of a content management unit (CPS unit) to which a unit key is assigned is discussed below with reference to FIG. 4.

The configuration in which content management units (CPS units) of the main content 200 are set is first discussed below.

In the main content 200, the application index files 211 and 212 including at least one title of the application layer 210 indicated by (A) in FIG. 4 is set as a CPS unit. Similarly, the application execution file 213 can be set as a CPS unit, and the application execution files 214 and 215 can be set as a CPS unit.

In FIG. 4, a CPS unit-1 401 includes the application index files 211 and 212, the playback programs 221 and 222, the playlists 231 and 232, and a set of AV stream files (clips 241 and 242) as real content data.

A CPS unit-2 402 includes the application execution file 213, the playback program 223, the playlist 233, and a set of AV stream files (clip 243) as real content data.

A CPS unit-3 403 includes the application execution files 214 and 215, the playback program 224, and various files (image files 225, audio files 226, data files 227) that can be obtained from information recording media or a network-connected server.

Those CPS units are encrypted with the corresponding CPS unit keys Ku1, Ku2, and Ku3 and are then stored in an information recording medium.

In FIG. 4, the content management units (CPS units) 401 and 402 are formed of the application layer 210 indicated by (A), which serves as the upper layer, the playback zone specifying file layer 230 indicated by (B), and the clip layer (content data files) indicated by (C), which serve as the lower layers. The content management unit (CPS unit) 403 is formed of the application layer 210 and various files, such as the image files 225, the audio files 226, and the data files 227, that can be obtained from an information recording medium or a network-connected server, i.e., the content management unit (CPS unit) 403 does not include (B) the playback zone specifying file layer 230 or (C) the clip layer 240.

As stated above, the content management unit (CPS unit)-1 401 includes the title-1 211, the title-2 212, the playback programs 221 and 222, the playlists 231 and 232, and the clips 241 and 242. The AV stream data files 261 and 262, which are real content data, contained in the two clips 241 and 242, respectively, are encrypted with the unit key Ku1 assigned to the content management unit (CPS unit)-1 401.

The content management unit (CPS unit)-2 402 includes the application file 213, for example, game content or web content, the playback program 223, the playlist 233, and the clip 243. The AV stream data file 263, which is real content data, contained in the clip 243 is encrypted with the unit key Ku2 assigned to the content management unit (CPS unit)-2 402. The application file 213 may also be encrypted with the unit key Ku2.

The content management unit (CPS unit)-3 403 includes the application files 214 and 215, the playback program 224, and various data files, such as the image files 226, the audio files 226, and the data files 227, that can be obtained from an information recording medium or a network-connected server by the playback program 224. The content management unit (CPS unit)-3 403 is encrypted with the unit key Ku3 assigned to the content management unit (CPS unit)-3 403.

To play back an application file or content associated with the content management unit (CPS unit)-1 401, it is necessary for the user to obtain the unit key Ku1 by using the recording seed Vu1 assigned to the content management unit (CPS unit)-1 401 and then to execute the content decryption sequence by using the unit key Ku1. After decrypting the content, the user can play back the content by executing the application program.

For example, to use the application file 214 or 215 or the image file 225, the audio file 226, or the data file 227 associated with the content management unit (CPS unit)-3 403, it is necessary for the user to obtain the unit key Ku3 assigned to the content management unit (CPS unit)-3 403 as the cryptographic key and then to decrypt the corresponding file. After decrypting the file, the user can execute the application program or the file.

4. Management Structure for Subsequently Generated/Obtained Data

As stated above, content stored in an information recording medium is divided into CPS units, and the CPS unit key as the cryptographic key associated with each CPS unit is obtained by using the corresponding recording seed. Then, the CPS units can be decrypted with the associated CPS unit keys.

A description is now given of data different from content stored in an information recording medium, i.e., subsequently generated/obtained data, which is generated or obtained by a user afterwards, for example, data generated according to a program stored in an information recording medium or data generated while data stored in an information recording medium is being played back. Specific examples of such subsequently generated/obtained data are data concerning a game program in progress or character data generated by executing the game program, or data obtained from a server via a network, and text or image data formed by the user.

Figure 5:
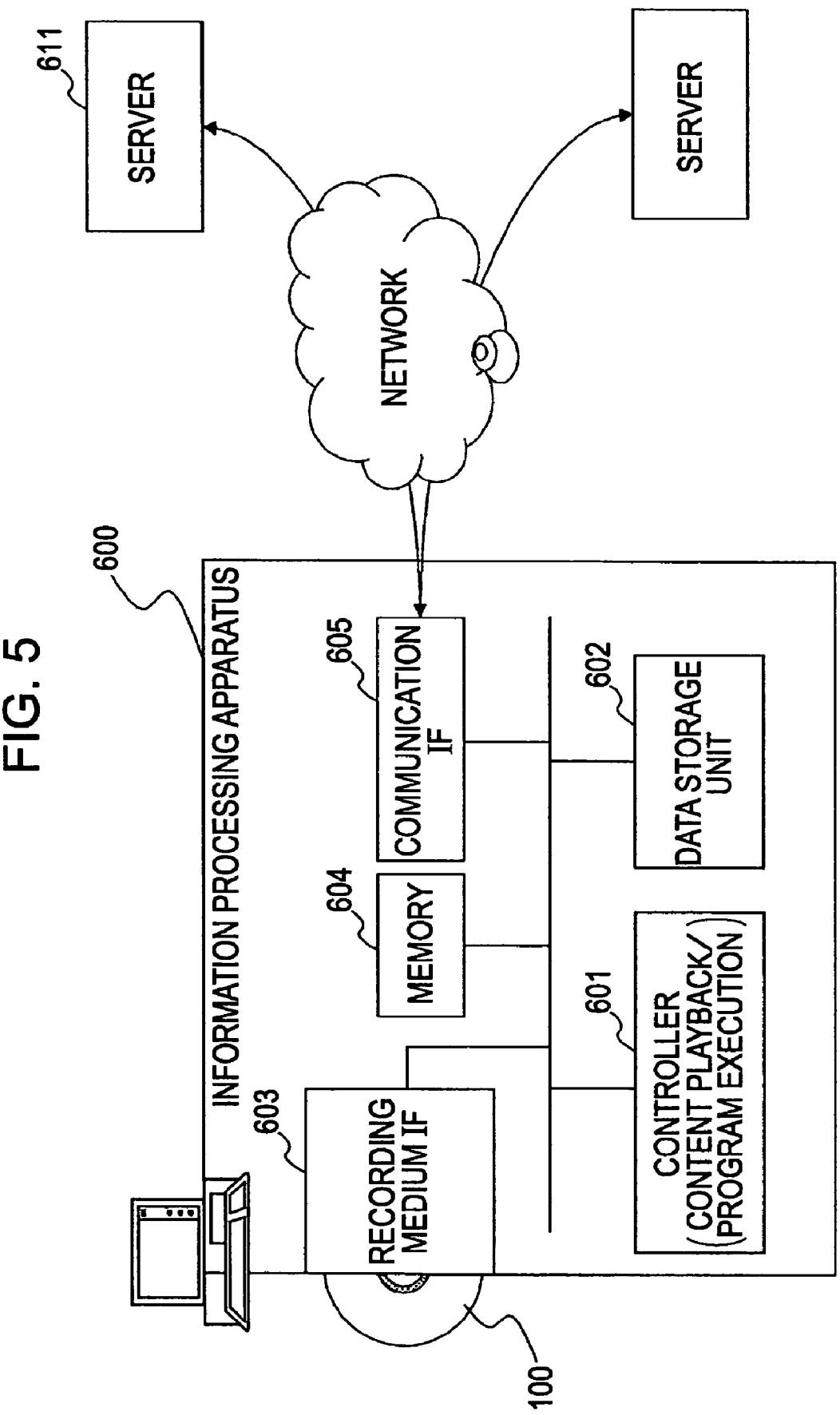
FIG. 5 generating/obtaining of data by an information processing apparatus which installs an information recording medium therein.

Generating or obtaining data related to content stored in an information recording medium is shown in FIG. 5 by way of example.

FIG. 5 illustrates an information processing apparatus 600, such as a PC, performing a playback operation on an information recording medium. The information processing apparatus 600 includes a controller 601 having a program executing function, such as a central processing unit (CPU), that plays back content and executes programs, a data storage unit 602, such as a hard disk, a recording medium interface 603 that inputs and outputs data from and to an information recording medium, a memory 604, for example, a random access memory (RAM) or a ROM, used as a program execution area or a parameter storage area, and a communication interface 605 that performs communication via a network. In FIG. 5, only a minimal configuration of the information processing apparatus 600 for generating or obtaining data afterwards is shown, and a specific hardware configuration of the information processing apparatus 600 is described later.

The information processing apparatus 600 reads CPS units divided from content stored in the information recording medium 100 via the recording medium interface 603, and controls the playback processing on the content under the control of the controller 601. The playback processing for the content managed on the basis of the CPS units and storage and usage processing on subsequently generated/obtained data are executed by applying a licensed program.

In the information recording medium 100, content recorded based on, for example, the Blu-ray disc ROM standard, as discussed with reference to FIGS. 3 and 4, are stored. Each item of content is divided into CPS units, and they are encrypted.

To play back the content, the information processing apparatus 600 generates a CPS unit key based on the recording seed associated with the CPS unit. The content includes games, various programs, such as AV stream playback programs, and AV stream data.

There are two modes in which the information processing apparatus 600 generates or obtains data on the basis of data read from the information recording medium 100.

In the first mode, the information processing apparatus 600 reads information that can be analyzed by the information processing apparatus 600 from the information recording medium 100, and then obtains or generates new data based on the read information. For example, the information processing apparatus 600 obtains uniform resource locator (URL) information concerning the location of subsequently generated/obtained data from the information recording medium 100, and accesses a server 611 designated by the URL by using a browser via the communication interface 605 and a network. Then, the information processing apparatus 600 downloads data, such as new content, associated with the URL. Instead of downloading content, the information processing apparatus 600 may generate subsequently generated/obtained data based on information read from the information recording medium 100.

In the second mode, the information processing apparatus 600 generates or obtains data based on an application program recorded on the information recording medium 100. For example, the information processing apparatus 600 executes a program read from the information recording medium 100 and is connected to the server 611 via the communication interface 605 and a network according to the read program, and then downloads content. Alternatively, the information processing apparatus 600 may generate subsequently generated/obtained data by executing an application program.

The data generated or obtained by various operations described above is not data belonging to CPS units, which are management units of content recorded on the information recording medium 100. However, according to this embodiment, such subsequently generated/obtained data is managed as data belonging to specific CPS units.

More specifically, subsequently generated/obtained data generated or obtained based on content stored in the information recording medium 100 is managed as data belonging to the same CPS unit as that of the content. Alternatively, new CPS units are defined, and subsequently generated/obtained data are managed on the basis of such new CPS units.

Figure 6:
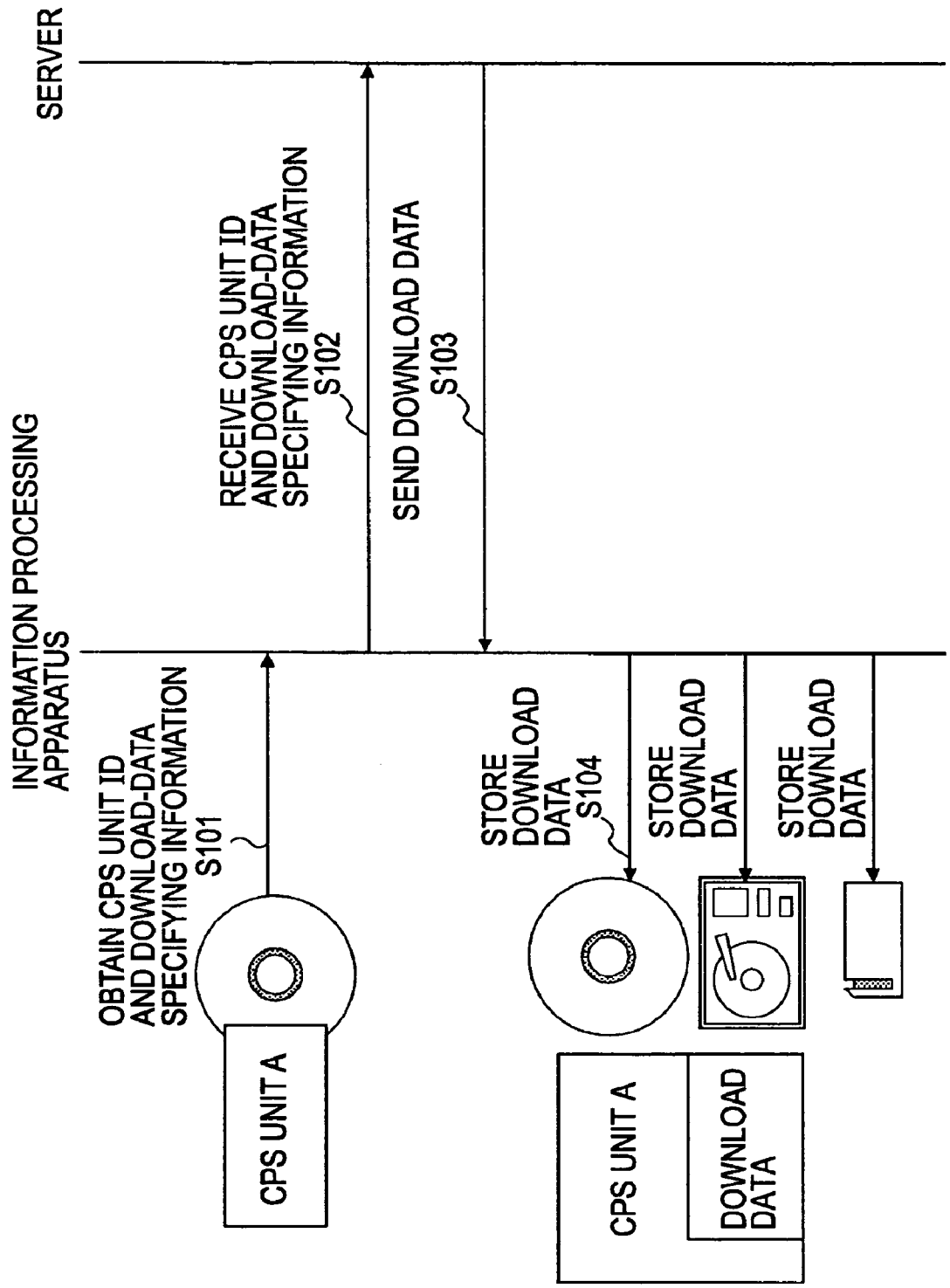
FIG. 6 is a processing sequence for obtaining subsequently generated/obtained data by an information processing apparatus.

FIG. 6 illustrates a processing sequence for obtaining data from an external source based on content stored in the information recording medium 100.

In step S101, the information processing apparatus 600 reads content managed on the basis of a CPS unit, for example, content belonging to CPS unit A. The information processing apparatus 600 also reads download-data specifying information, for example, a URL, from the information recording medium 100 and obtains the CPS unit ID as the identifier of the CPS unit A corresponding to the read content.

Then, in step S102, the information processing apparatus 600 sends the CPS unit ID and the download-data specifying information to the server.

The server conducts authentication according to a predetermined authentication sequence to verify whether the received CPS unit ID has been obtained from an authorized information recording medium. If the integrity of the CPS unit ID has been verified, in step S103, the server sends the requested download data, for example, dubbed sound data or subtitle data of AV streams, or a playback program for specific content, to the information processing apparatus 600.

In step S104, the information processing apparatus 600 stores the download data obtained from the server in the information recording medium 100 or a storage unit, such as a hard disk within the information processing apparatus 600 or a removable memory. The download data is stored and managed as data belonging to CPS unit A specified by the CPS unit ID. More specifically, the download data is encrypted with CPS unit key Ku (a) generated by using recording seed Vu (a) set for the CPS unit A. The encrypted data is then stored.

According to the sequence discussed with reference to FIG. 6, when the information processing apparatus 600 requests the server to send download data, the CPS unit ID and the download-data specifying information are sent to the server. The reason for sending the CPS unit ID is to enable the following types of management.

(1) The server can manage download data for each CPS unit.

(2) If the permission of downloading or billing is managed for each CPS unit, CPS units downloaded once can be downloaded only by sending the CPS unit ID from the next time.

(3) If download data is encrypted by using the key (unit key) defined for each CPS unit in the information recording medium, it is necessary for the server to have the CPS unit ID to encrypt the download data. The server stores the CPS unit key associated with the CPS unit ID and encrypts the data by using the stored CPS unit key, thereby making it possible to send data securely.

As the download-data specifying information, information other than the URL, such as the studio ID, package ID, volume ID, title ID, movie object ID, playlist ID, or playback zone information (time stamps for the start point and the end point), which are defined by the Blu-ray disc ROM standards may be used. Alternatively, information which is not defined by the Blu-ray disc ROM standard may be used as the download-data specifying information. For example, user attribute information, such as the user ID or billing condition, time and date information, or management data generated by the information processing apparatus 600 when playing back content, for example, the number of playback operations, range that has been played back, game score, and multi-storied playback path, may be used as the download-data specifying information as long as the server can specify download data by using such information.

Specific examples of data generated or obtained by the information processing apparatus 600 are discussed below with reference to FIGS. 7 and 8.

Figure 7:
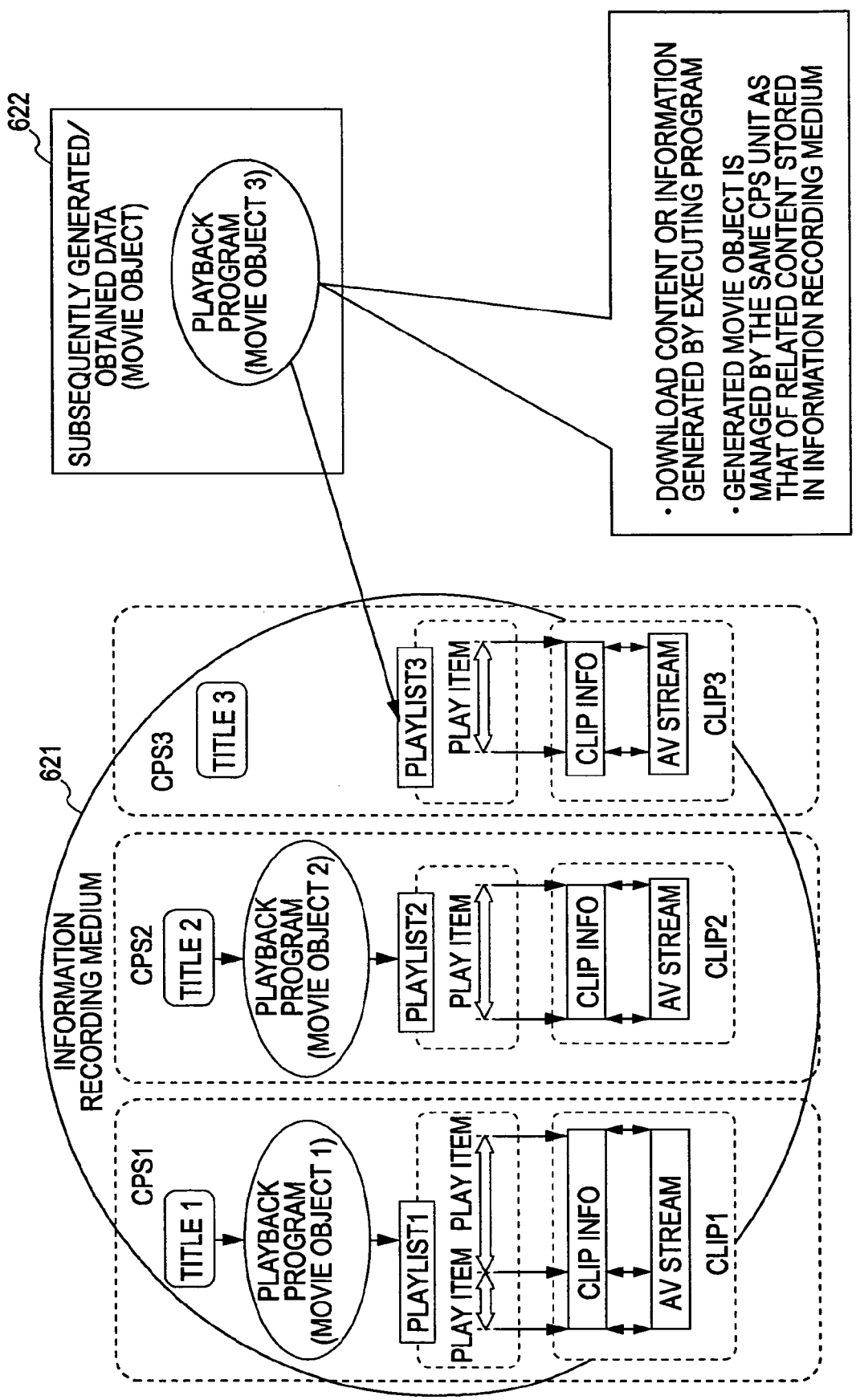
FIGS. 7 and 8 illustrate examples of data subsequently generated or obtained by an information processing apparatus.

FIG. 7 illustrates an example in which part of the data based on the Blu-ray disc ROM standard format is generated or obtained afterwards. As discussed with reference to FIGS. 3 and 4, content stored in an information recording medium according to the Blu-ray disc ROM standard format has a hierarchical structure, and, for example, AV stream content can be played back by being associated with the data and programs of the individual layers of the hierarchical structure.

In an information recording medium 621 shown in FIG. 7, CPS units 1, 2, and 3 associated with titles 1, 2, and 3, respectively, are set as content based on the Blu-ray disc ROM standard format.

In the CPS units 1 and 2 associated with the titles 1 and 2, respectively, movie objects 1 and 2 as the playback programs corresponding to the titles 1 and 2, respectively, are stored. The user installs the information recording medium 621 in the information recording apparatus 600 and specifies the title 1 or title 2 to execute the corresponding movie object 1 or 2, thereby playing back a clip file in a zone designated by the corresponding playlist, i.e., AV stream data. To do so, however, it is necessary to decrypt the encrypted data, such as the encrypted AV streams, by extracting the recording seed associated with the CPS unit 1 or 2 from management data and by generating the CPS unit key by using the recording seed.

In contrast, in the CPS unit 3, movie object 3 as the playback program associated with the title 3 is not stored, and thus, a clip file contained in the CPS unit 3, i.e., AV stream data, cannot be played back. In this case, the information processing apparatus 600 generates or obtains the movie object 3 as the playback program associated with the title 3, i.e., as subsequently generated/obtained data 622. The generated or obtained movie object 3 is managed as data forming the CPS unit 3.

Figure 8:
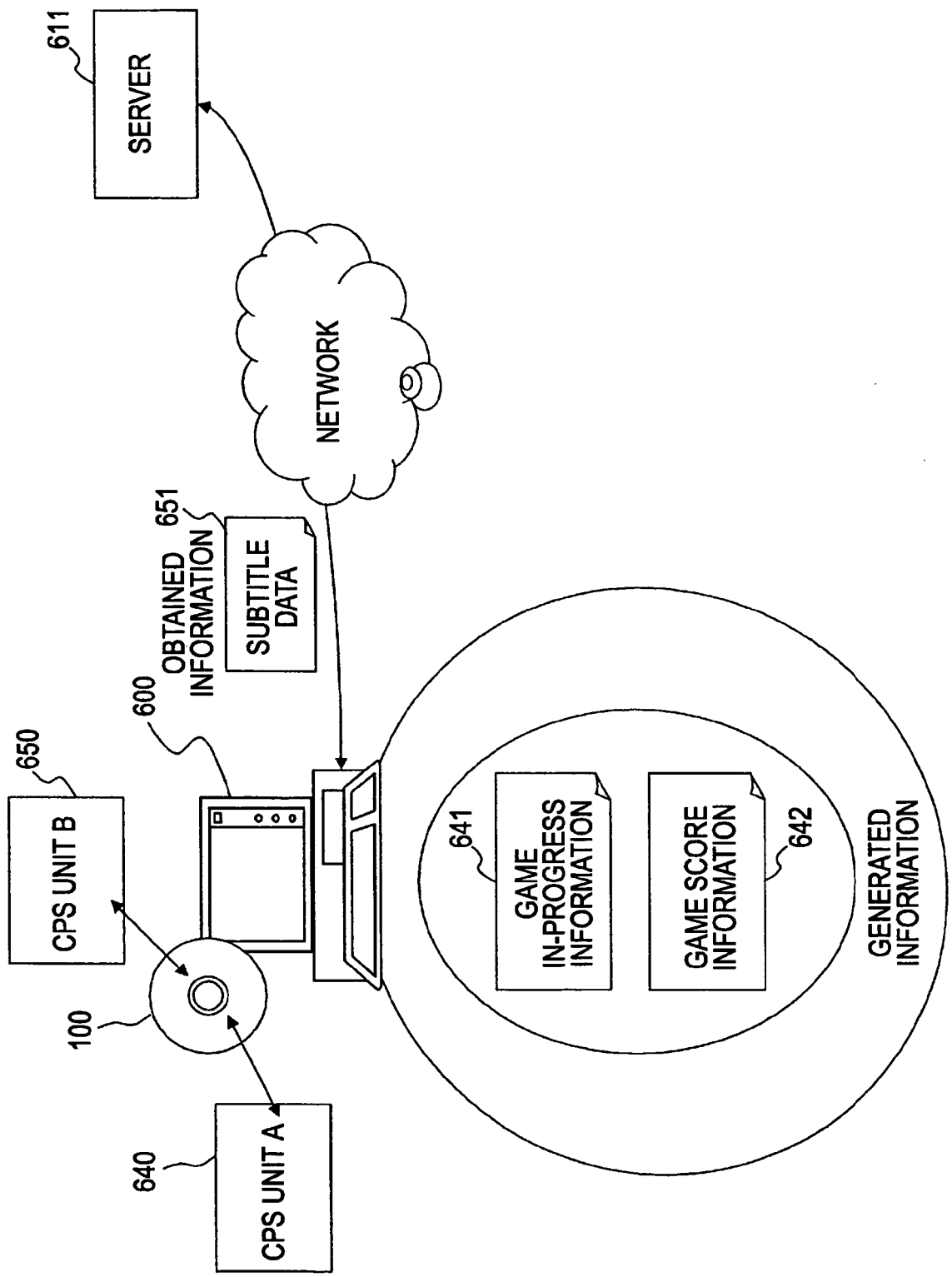

FIG. 8 illustrates other specific examples of data generated or obtained by the information processing apparatus 600.

The information processing apparatus 600 plays back content which is managed on the basis of a plurality of CPS units from the information recording medium 100.

For example, a CPS unit-A 640 is a content management unit containing a game program, and the information processing apparatus 600 executes this game program to generate game in-progress information 641 and game score information 642, respectively, as subsequently generated/obtained data. The information processing apparatus 600 then sets the subsequently generated/obtained data 641 and 642 as data forming the CPS unit-A 640 and stores them in the information recording medium 100 or a storage unit, such as a hard disk, contained in the information processing apparatus 600.

A CPS unit-B 650 is a content management unit containing moving-picture AV stream content, such as a movie, and the information processing apparatus 600 obtains subtitle data 651 associated with the AV stream content from the server 611 as subsequently generated/obtained data, and plays back the subtitle data 651. The information processing apparatus 600 then sets the subtitle data 651 as data forming the CPS unit-B 650 and stores it in the information recording medium 100 or a storage unit, such as a hard disk, contained in the information processing apparatus 600.

In the above-described examples, the subsequently generated/obtained data is included in the same CPS unit as that of the corresponding content. Alternatively, new CPS units may be set for subsequently generated/obtained data, and then, the subsequently generated/obtained data may be stored as data forming the new CPS units in the information recording medium 100, or a storage unit, such as a hard disk contained in the information processing apparatus 600 or a removable memory. As the new CPS units, CPS units corresponding to new data, such as those indicated in the new data field 121 shown in FIG. 2, are set. The recording seeds Vu associated with the new CPS units are prestored in the information recording medium 100, and CPS unit keys are generated by using the recording seeds Vu according to a predetermined encryption processing sequence. By using the generated CPS unit keys, the subsequently generated/obtained data are encrypted and are then stored in the information recording medium 100 or a storage unit, such as a hard disk contained in the information processing apparatus 600 or a removable memory.

The recording seeds Vu associated with the new CPS units may be obtained from an external server. In this case, however, it is desirable that predetermined authentication processing be conducted between the server and the information processing apparatus 600 to prevent the unauthorized operation to obtain the recording seeds Vu. The recording seeds Vu are obtained in association with the elements forming the CPS units in the management table shown in FIG. 2.

A CPS unit management content stored in an information recording medium, such as a DVD, and subsequently generated/obtained data stored in a local storage, such as a hard disk, may be played back separately. Alternatively, they may be played back together. An example of parallel playback processing for playing back two types of content together is discussed below with reference to FIG. 9.

Figure 9:
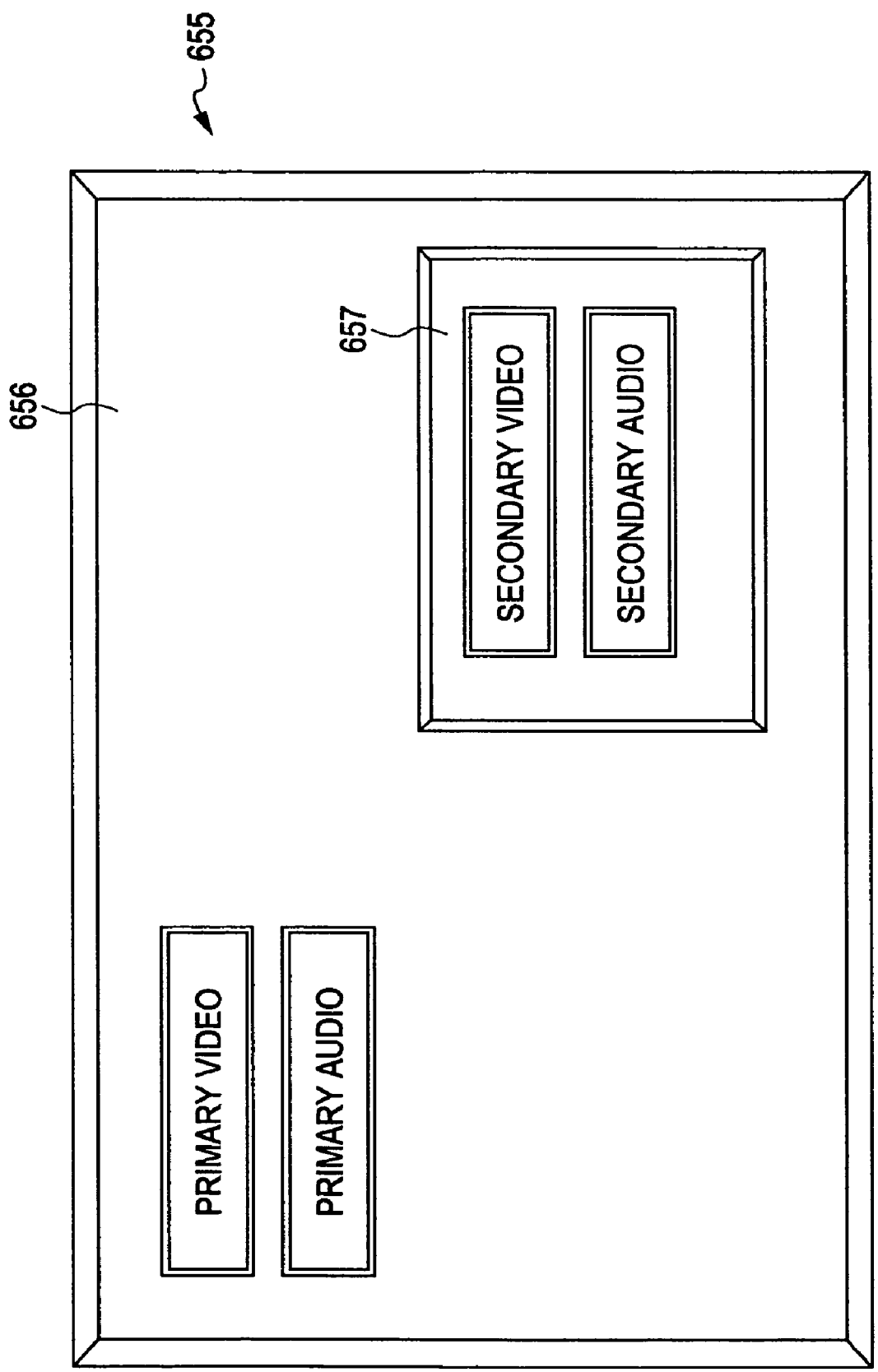
FIG. 9 illustrates an example of content playback processing in an information processing apparatus.

As main information to be output to an output unit 655 including a display and a speaker of an information processing apparatus, as shown in FIG. 9, primary video, which serves as main video, and primary audio, which serves as main audio, are output by using a main screen area 656 of the display. At the same time, a sub-screen area 657 is set in part of the output unit 655, and secondary video, which serves as sub video, and secondary audio, which serves as sub audio, are output by using the sub-screen area 657.

The technique for setting the sub-screen area 657 in the main screen area 656 and outputting images in an overlapping manner is referred to as the "picture-in-picture (PIP)" technique. That is, parallel output processing is performed, and more specifically, an image of a main movie is output to the main screen area 656, and an image of a movie director is output to the sub-screen area 657 so that the image of the movie director is overlapped on the image of the main movie.

In this case, parallel output processing can be implemented by outputting images from different recording media, for example, by outputting a CPS unit management content, for example, a movie, stored in an information recording medium, such as a DVD, to the main screen area 656, and by outputting data, for example, a director's image, stored in a local storage, such as a hard disk, to the sub-screen area 657. Alternatively, both types of content may be output from one recording medium.

The same applies to primary audio and secondary audio. Parallel output processing can be implemented by outputting two types of data from different recording media, and more specifically, by outputting data, for example, director's commentaries, stored in a local storage, such as a hard disk, together with sound of CPS unit management content, for example, a movie, stored in an information recording medium, such as a DVD. Alternatively, both types of content may be output from one recording medium.

Encryption and management of subsequently generated/obtained data is described below with reference to FIG. 10.

Figure 10:
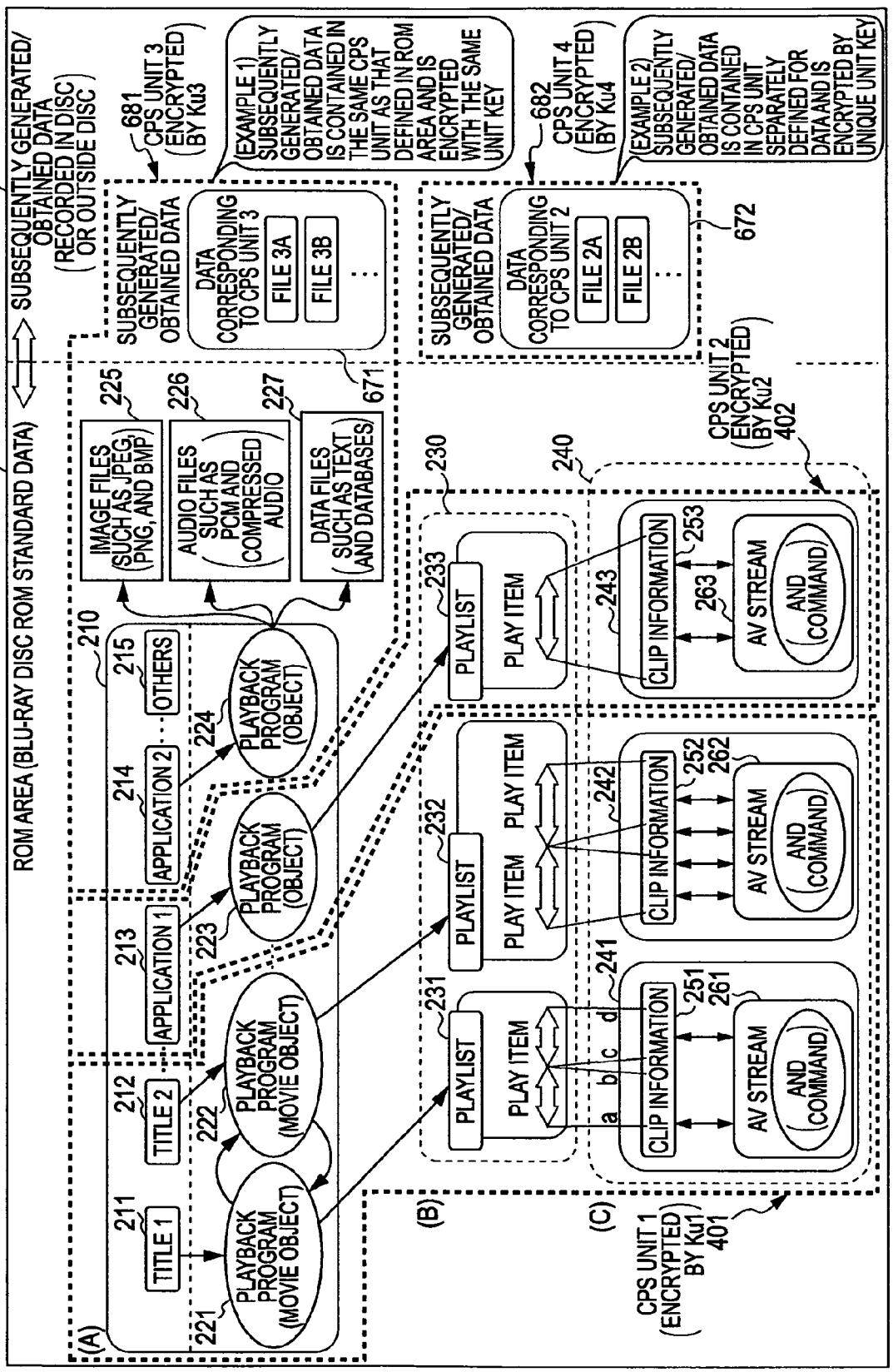
FIG. 10 illustrates the relationship between subsequently generated/obtained data and CPS units.

FIG. 10 illustrates an example of a data encryption method when data generated or obtained in accordance with a playback operation for content stored in an information recording medium is recorded in or outside the information recording medium.

In FIG. 10, the data area shown at the left side is data stored in the information recording medium, i.e., ROM area data 660, and the data area shown at the right side is subsequently generated/obtained data 670 as data generated or obtained afterwards. The subsequently generated/obtained data 670 is stored in a data writable area of the information recording medium, a hard disk, or an external storage unit, such as a removable memory. In FIG. 10, two examples are shown as the methods for setting CPS units for subsequently generated/obtained data.

EXAMPLE 1

As indicated in a CPS unit-3 681 shown in FIG. 10, subsequently generated/obtained data 671 is integrated into a CPS unit that has been set in the information recording medium.

The CPS unit-3 681 contains data stored in the data area 660 of the information recording medium and also integrates the subsequently generated/obtained data 671 therein. In this case, the subsequently generated/obtained data 671 or data contained in the subsequently generated/obtained data 671 is encrypted with the unit key Ku3 generated by using the recording seed Vu3 set for the CPS unit 3, and is then stored in the information recording medium or a storage unit, such as a hard disk.

In this example, the subsequently generated/obtained data 671 is encrypted with the same key as the unit key for the CPS unit defined in the ROM area of the information recording medium, and when playing back the content, the subsequently generated/obtained data 671 can be decrypted with the same key as the data contained in the CPS unit defined in the ROM area. Accordingly, the seamless playback operation can be implemented without the need to change keys.

EXAMPLE 2

As indicated in a CPS unit-4 682 in FIG. 10, a new CPS unit, which is different from the CPS unit defined in the information recording medium, is set for subsequently generated/obtained data 672.

The CPS unit-4 682 is separately defined for the subsequently generated/obtained data 672, and the data contained in the subsequently generated/obtained data 672 is encrypted with the corresponding unit key. The CPS unit-4 682 is managed independently of the data stored in the information recording medium. In this case, it is necessary to set and record, as management data, information for assigning the CPS unit to the subsequently generated/obtained data 672 and information for generating the unit key.

An example of the method for setting content usage control information for data to be subsequently generated or obtained and stored in a local storage, such as a hard disk, as management data is discussed below with reference to FIG. 11.

Figure 11:
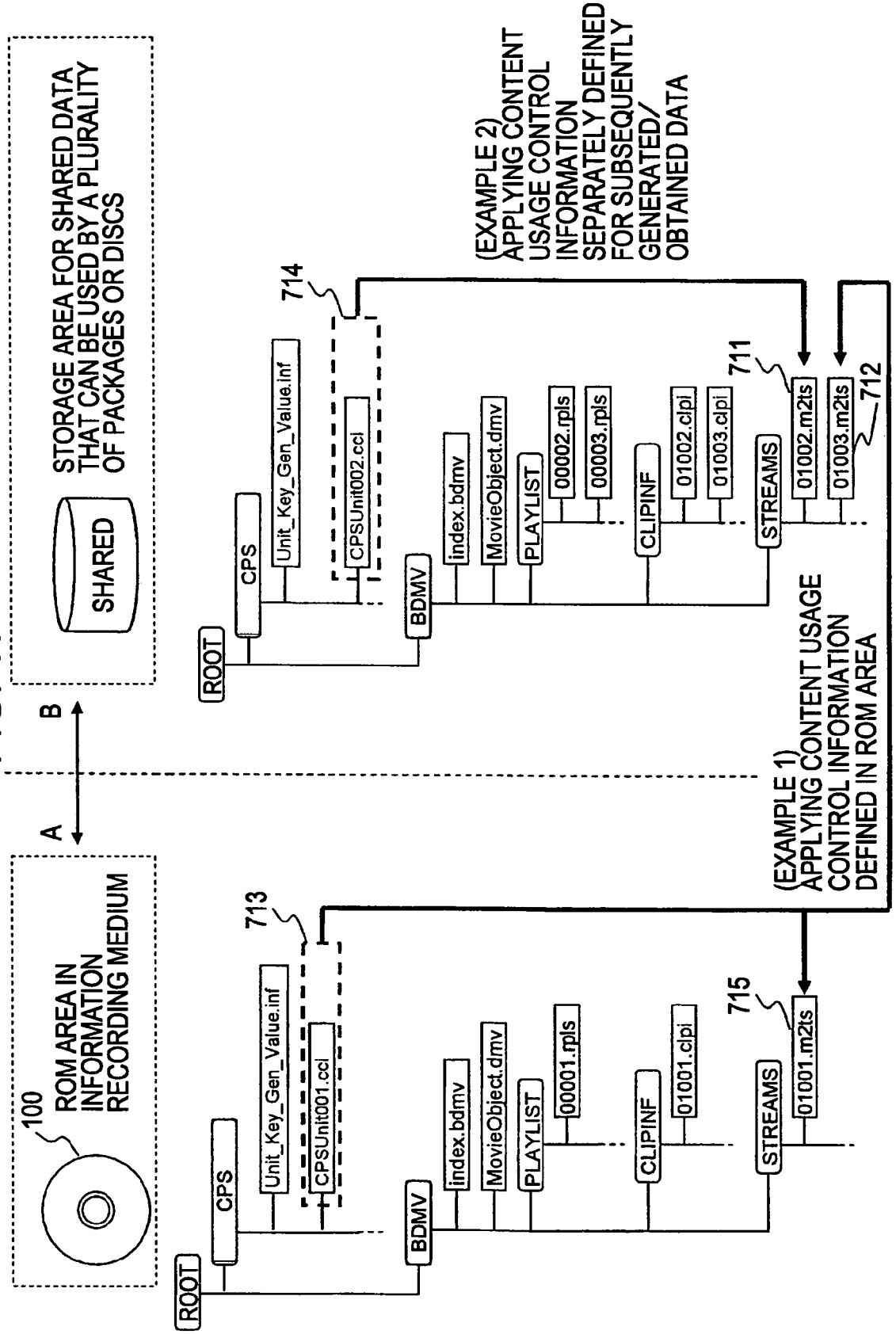
FIG. 11 illustrates examples of setting playback/copy control information for data subsequently generated/obtained by an information processing apparatus.

FIG. 11 illustrates directory A corresponding to CPS management units that have been stored in the information recording medium 100, such as a DVD, and directory B corresponding to subsequently generated/obtained data stored in a local storage, such as a hard disk. The directory B is a directory set for shared data that can be used by a plurality of different packages or discs.

In both the directory A and directory B shown in FIG. 11, the data are set in the BDMV directory as content based on the Blu-ray disc ROM standard format, and various management data are stored in the CPS directory.

The content usage control information is recorded by one of the following two methods.

EXAMPLE 1

Existing content usage control information stored in the information recording medium 100, such as a DVD, is used as content usage control information for subsequently generated/obtained data.

More specifically, content usage control information [CPSUnit001.cci] 713 associated with data [01001.m2ts] 715 of CPS unit 001 stored in the information recording medium 100 is directly used, as shown in FIG. 11, as content usage control information associated with subsequently generated/obtained data [01003.m2ts] 712 stored in a local storage.

In this case, it is not necessary to generate content usage control information corresponding to the subsequently generated/obtained data [01003.m2ts] 712. The content usage control information [CPSUnit001.cci] 713 associated with CPS unit 001 is set as content usage information used for both the existing data [01001.m2ts] 715 and the subsequently generated/obtained data [01003.m2ts] 712.

EXAMPLE 2

New content usage control information is generated for subsequently generated/obtained data in a local storage. More specifically, new content usage control information [CPSUnit002.cci] 714 is generated and managed for subsequently generated/obtained data [01002.m2ts] 711, as shown in FIG. 11.

The method in example 1 is suitable on the occasion when, for example, subtitle data of a language which is not recorded in the ROM area of the information recording medium 100 is downloaded and is played back together with video/audio data recorded in the ROM area. In this case, it is natural to consider that both the data recorded in the ROM area and the downloaded data belong to the same CPS unit.

The method in example 2 is suitable on the occasion when, for example, it is desired that data generated by executing an application program read from the information recording medium 100 be shared and copied among a plurality of users. Although data, such as applications and AV streams, recorded in the ROM area cannot be copied, data generated by an application (for example, information that can be sent to other users or to other portable machines, such as game score information and map information) may be played back or copied. In this case, playback/copy control different from that recorded in the ROM area is necessary.

Figure 12:
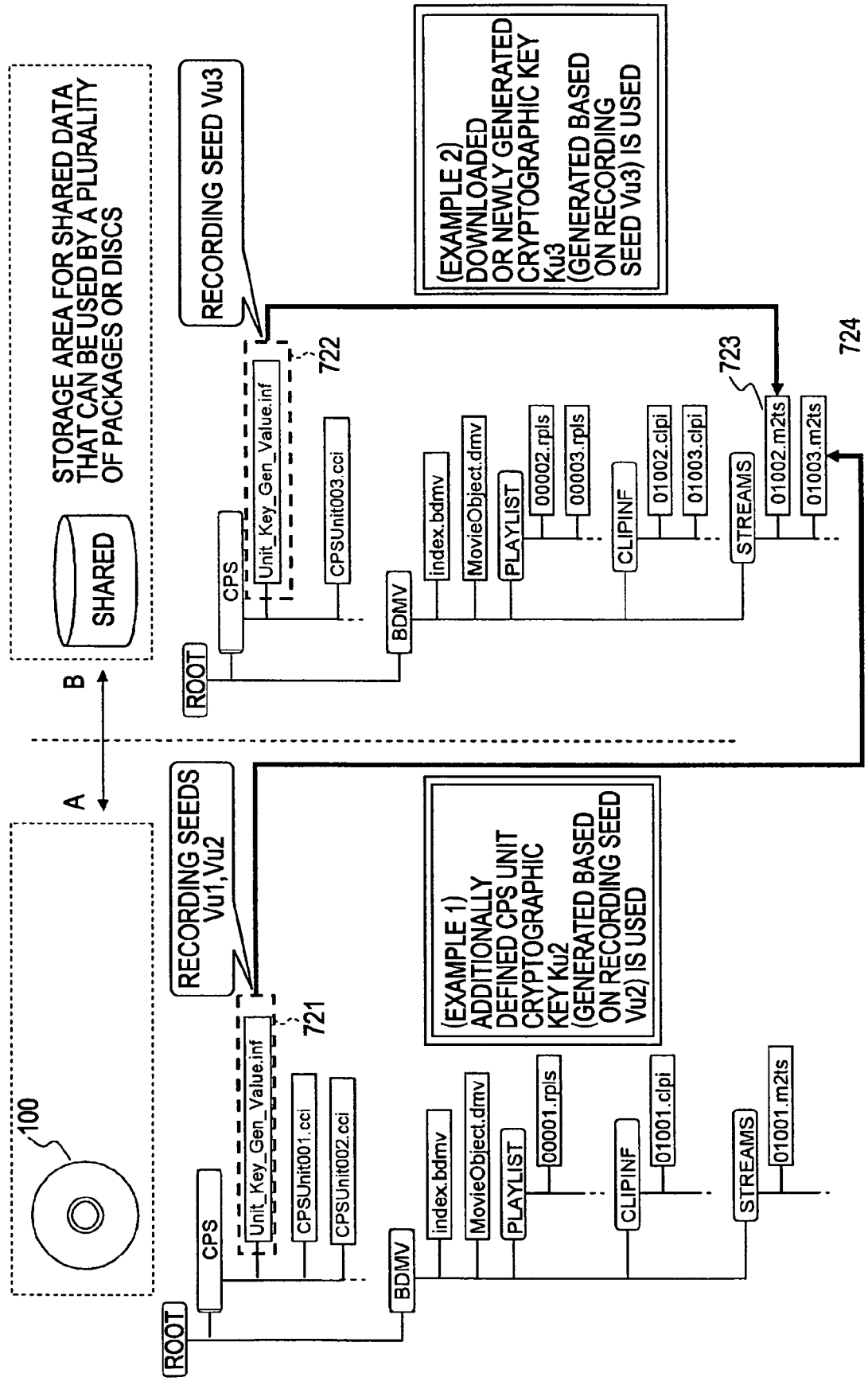
FIG. 12 illustrates examples of the setting of cryptographic key information for data subsequently generated/obtained by an information processing apparatus.

FIG. 12 illustrates an example of the method for setting recording seeds used for generating cryptographic keys, i.e., unit keys associated with individual CPS units.

As in FIG. 11, FIG. 12 illustrates directory A associated with CPS management units that have been stored in the information recording medium 100 and directory B associated with subsequently generated/obtained data and is set for data stored in a shared-data storage area that can be used by a plurality of different packages or discs. In both the directory A and directory B shown in FIG. 12, data are set in the BDMV directory as content based on the Blu-ray disc ROM standard format, and various management data are stored in the CPS directory.

The recording seed is associated with each CPS unit identifier (CPS unit ID), as indicated in the CPS unit management table discussed with reference to FIG. 2. Cryptographic key information [Unit_Key_Gen_Value.inf] 721 shown in FIG. 12 corresponds to the CPS unit management table stored in the information recording medium 100.

Recording seeds associated with the CPS units are set for subsequently generated/obtained data by one of the following two methods.

EXAMPLE 1

As the recording seeds for generating cryptographic keys for subsequently generated/obtained data, the recording seeds for new data that have been set in the CPS unit management table are used.

More specifically, the recording seed that has been set in the new data field 121 of the CPS unit management table shown in FIG. 2 is used as the recording seed for generating a cryptographic key for the subsequently generated/obtained data. In FIG. 12, the recording seed that has been set in the new data field 121 of the cryptographic key information [Unit_Key_Gen_Value.inf] 721, which is the management table data, stored in the information recording medium 100 is used as the recording seed for subsequently generated/obtained data [01003.m2ts] 724. In this example, a new CPS unit is defined, and the recording seed that has been set in the new data field 121 can be used.

EXAMPLE 2

As the recording seeds for generating cryptographic keys for subsequently generated/obtained data, new recording seeds are generated or obtained. In FIG. 12, cryptographic key information [Unit_Key_Gen_Value.inf] 722, which is new management tble data, is set for subsequently generated/obtained data [01002.m2ts] 723, and a new CPS unit identifier set as a new entry is associated with the recording seed. If the generation of recording seeds is allowed, the data processor of the information recording apparatus 600 generates new recording seeds by using, for example, random numbers. In this example, the setting of CPS units and the generation of recording seeds are allowed for new data without any restriction.

In the information processing apparatus 600, when a new CPS unit is set, it is necessary to associate management data, i.e., content usage control information, with the new CPS unit. In this case, one of the above-described two methods discussed with reference to FIG. 11 can be used, and more specifically, the existing content usage control information may be associated or new playback/control information may be set and associated with the new CPS unit.

5. Association of CPS Unit Data Stored in Information Recording Medium with CPS Unit Data Stored Outside Information Recording Medium As stated above, subsequently generated/obtained data, which is not stored as original data managed on the basis of CPS units in the information recording medium is stored in the information recording medium, a hard disk, or a removable memory, such as a flash memory. To handle the subsequently generated/obtained data as data to be managed by the CPS management data of the information recording medium, it is necessary to identify the subsequently generated/obtained data with the data to be managed by the CPS management data of the information recording medium. This is described in detail below.

Figure 13:
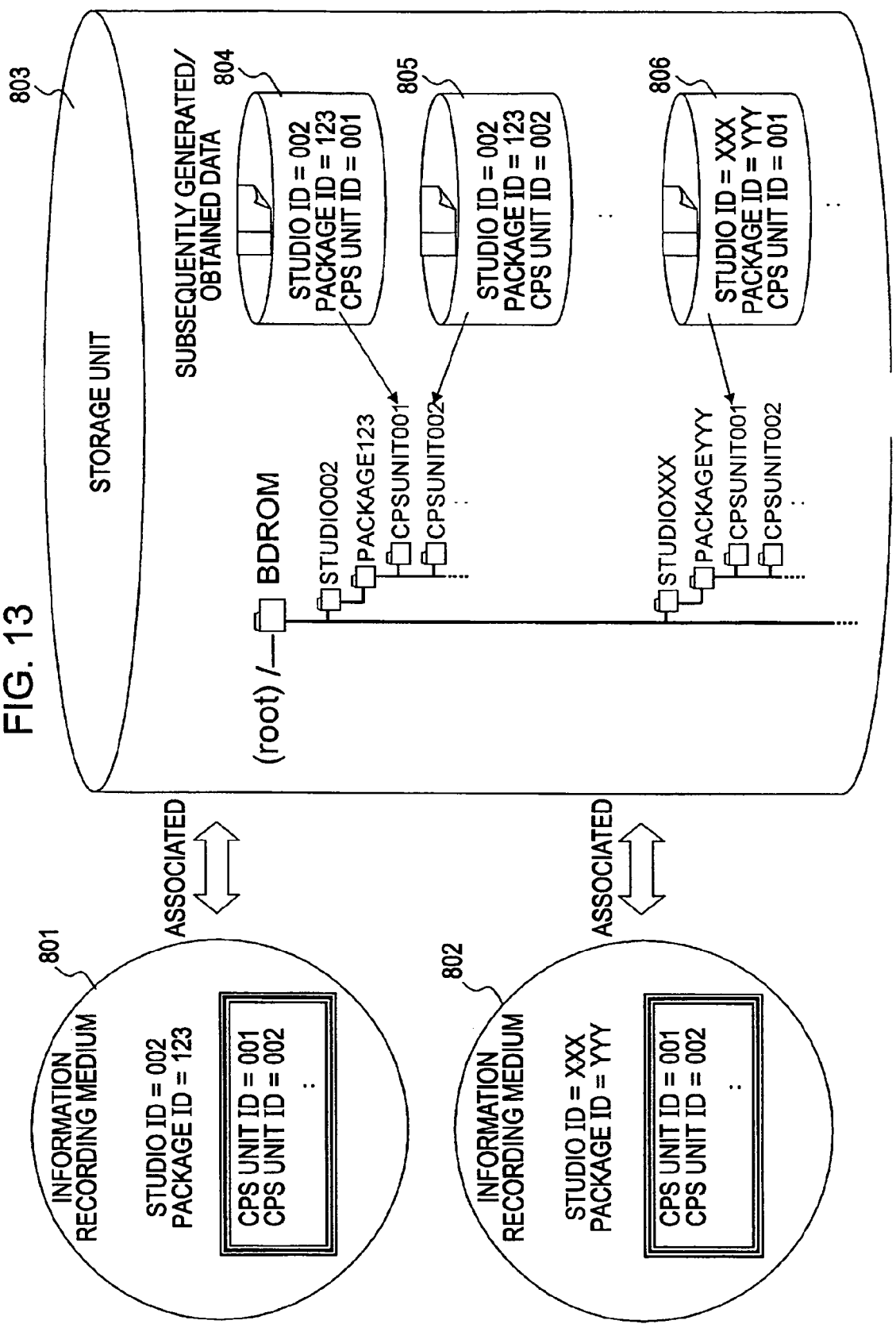
FIG. 13 illustrates an example of the identification of data subsequently generated/obtained by an information processing apparatus with CPS units.

FIG. 13 illustrates the association of subsequently generated/obtained data stored in a storage unit, for example, in a hard disk of the information processing apparatus 600, other than an information recording medium storing original CPS units, with the original CPS units.

When recording subsequently generated/obtained data on a storage unit other than information recording media storing original CPS units, as shown in FIG. 13, subsequently generated/obtained data corresponding to information recording media 801 and 802, each storing CPS units, is stored in one storage unit 803, such as a hard disk.

In this case, it is necessary to identify which subsequently generated/obtained data stored in the storage unit 803 corresponds to the information recording medium 801 or 802.

In each of the information recording media 801 and 802, as discussed with reference to FIG. 1, the studio ID as the identifier of the editing studio for the content stored in the information recording medium and the package ID as the package identifier, which serves as the manufacturing unit of the information recording medium, are stored.

Each of subsequently generated/obtained data 804, 805, and 806 stored in the storage unit 803 is provided with, as shown in FIG. 13, the studio ID, package ID, and CPS unit ID as identification data. A directory hierarchical structure is formed, as shown in FIG. 13, in the order of the studio IDs, package IDs, and CPS unit IDs, and data is stored and managed based on this directory hierarchical structure.

The data can be stored in the directory hierarchical structure in a desired format. For example, if data has been generated by using an application program, such as Java (trademark), it is not restricted to specific formats as long as it can be interpreted by Java when it is played back.

Figure 14:
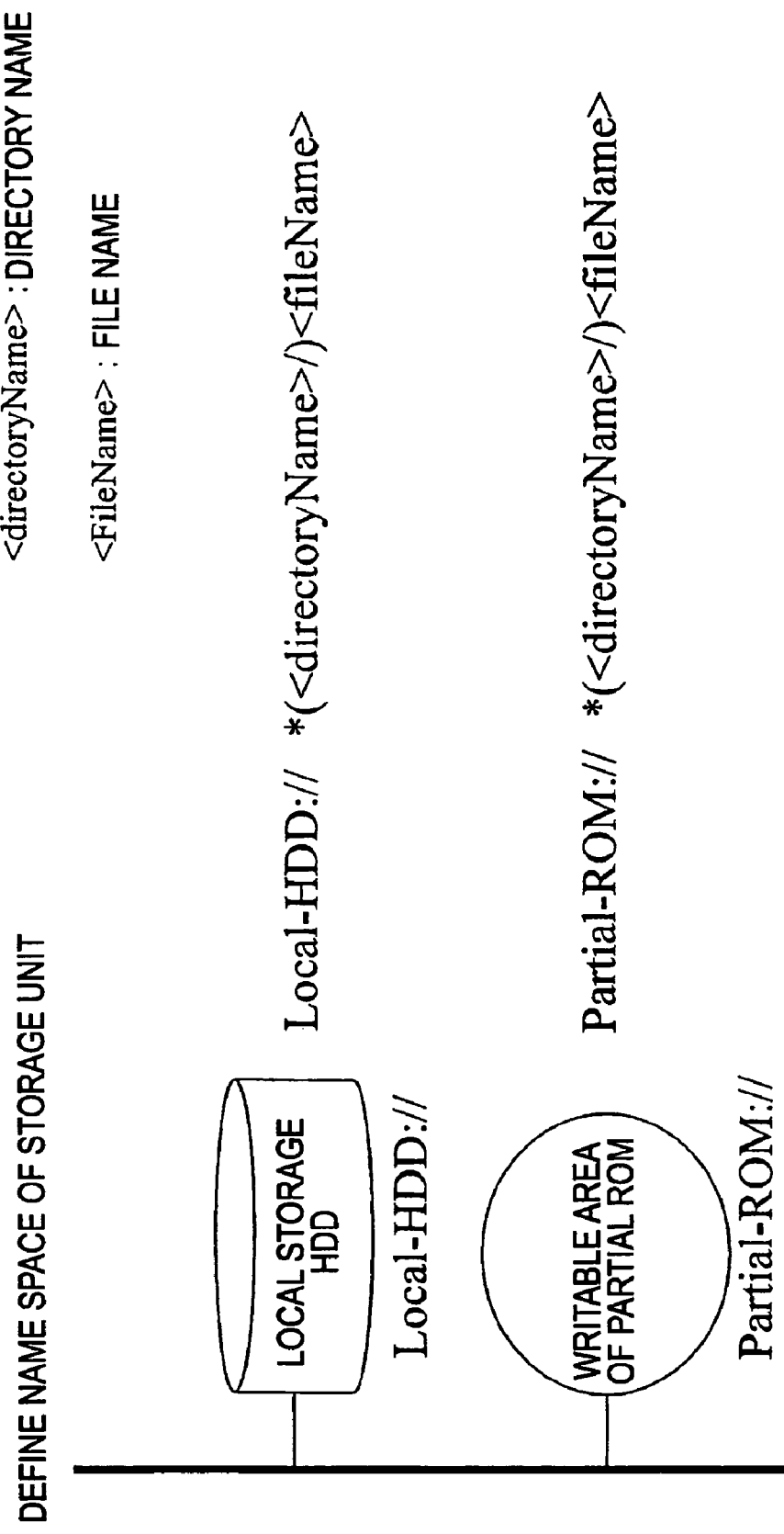
FIG. 14 illustrates an example of the identification of data subsequently generated/obtained by an information processing apparatus with CPS unit and the obtaining of such data.

When such a directory hierarchical structure is defined, data recorded in a storage unit other than information recording media storing original CPS units can be called by an execution program, such as Java, by referring to a name space, a directory, and a file name, as shown in FIG. 14. More specifically, the name space of the data writable area of the information recording medium storing original CPS unit and the name space of the hard disk are defined as [Partial-ROM://] and [Local-HDD://], respectively. Then, by specifying the storage file of each new data by the name space, directory, and file name, the file data can be read, updated, or rewritten.

6. Usage Control for Subsequently Generated/Obtained Data

As discussed above, subsequently generated/obtained data corresponding to CPS unit content stored in an information recording medium, such as a ROM disc, is stored in a local storage, such as a hard disk. If various information recording media, such as ROM discs, are used in an information processing apparatus, many subsequently generated/obtained data are stored in the local storage. In this case, the information processing apparatus requires data search when using subsequently generated/obtained data. Search information for efficiently obtaining necessary data from many subsequently generated/obtained data files set in a general-purpose directory and usage control for subsequently generated/obtained data are discussed below.

A description is first given, with reference to FIG. 15, of the use of content stored in an information recording medium, such as a ROM disc, and subsequently generated/obtained data stored in a local storage, such as a hard disk. If, for example, content stored in the information recording medium is French movie content and if, for example, subsequently generated/obtained data stored in the local storage is Japanese subtitle data associated with the French movie content, the French movie and the Japanese subtitles are played back together so that the French movie with the Japanese subtitles can be played back.

To perform parallel content playback, the information processing apparatus combines directories and files including a management file for subsequently generated/obtained data stored in the local storage with directories and files in the information recording medium in a virtual manner. In this virtual synthesizing processing, the data files in the information recording medium and the associated subsequently generated/obtained data files in the local storage are set as files in the single virtual directory. According to this processing, fast access to files stored in different recording media can be implemented.

Figure 15:
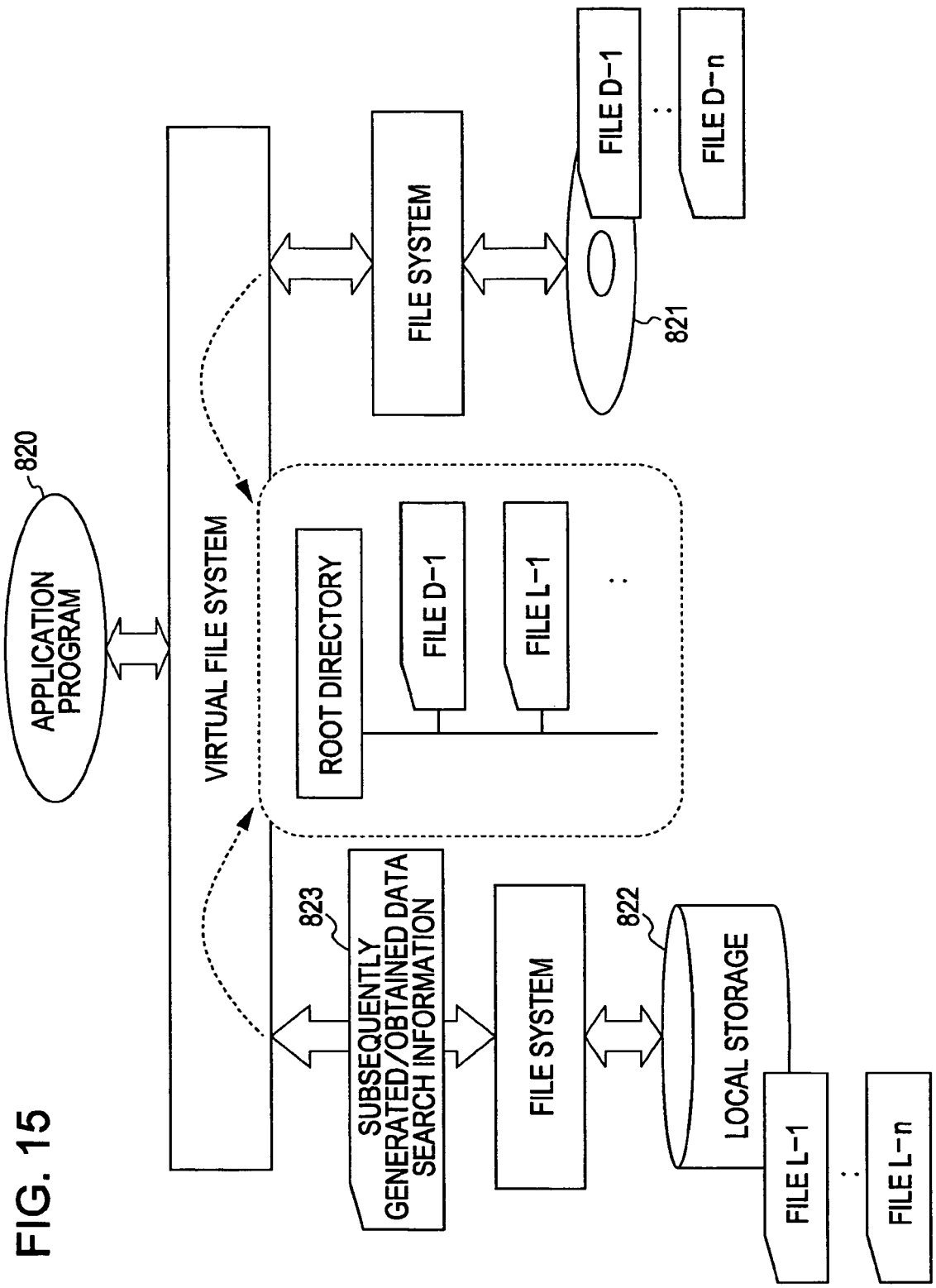
FIG. 15 illustrates a virtual file system generated by an information processing apparatus.

An application program 820 shown in FIG. 15 is, for example, a movie object, executed in an information processing apparatus. The application program 820 operates files recorded on an information recording medium 821, such as a ROM disc, and files recorded on a local storage 822 through a virtual file system. The application program 820 obtains, through the virtual file system, necessary subsequently generated/obtained data files by using subsequently generated/obtained data search information 823, which is search information concerning files stored in the local storage 822.

The virtual file system conceals differences in recording media (file systems) from the application program 820. Accordingly, the application program 820 can operate the files recorded on the recording media by using the same application program interface (API) without being aware of the differences in the recording media.

When a disc is installed in the information processing apparatus or when the application program 820 is started, the file system of the disc and the file system of the local storage are merged so that a virtual file system can be created. The created virtual file system is then stored in the memory of the information processing apparatus. In this case, every time a directory or a file recorded on the local storage is changed because of writing of data into the file, the virtual file system is updated.

Figure 16:
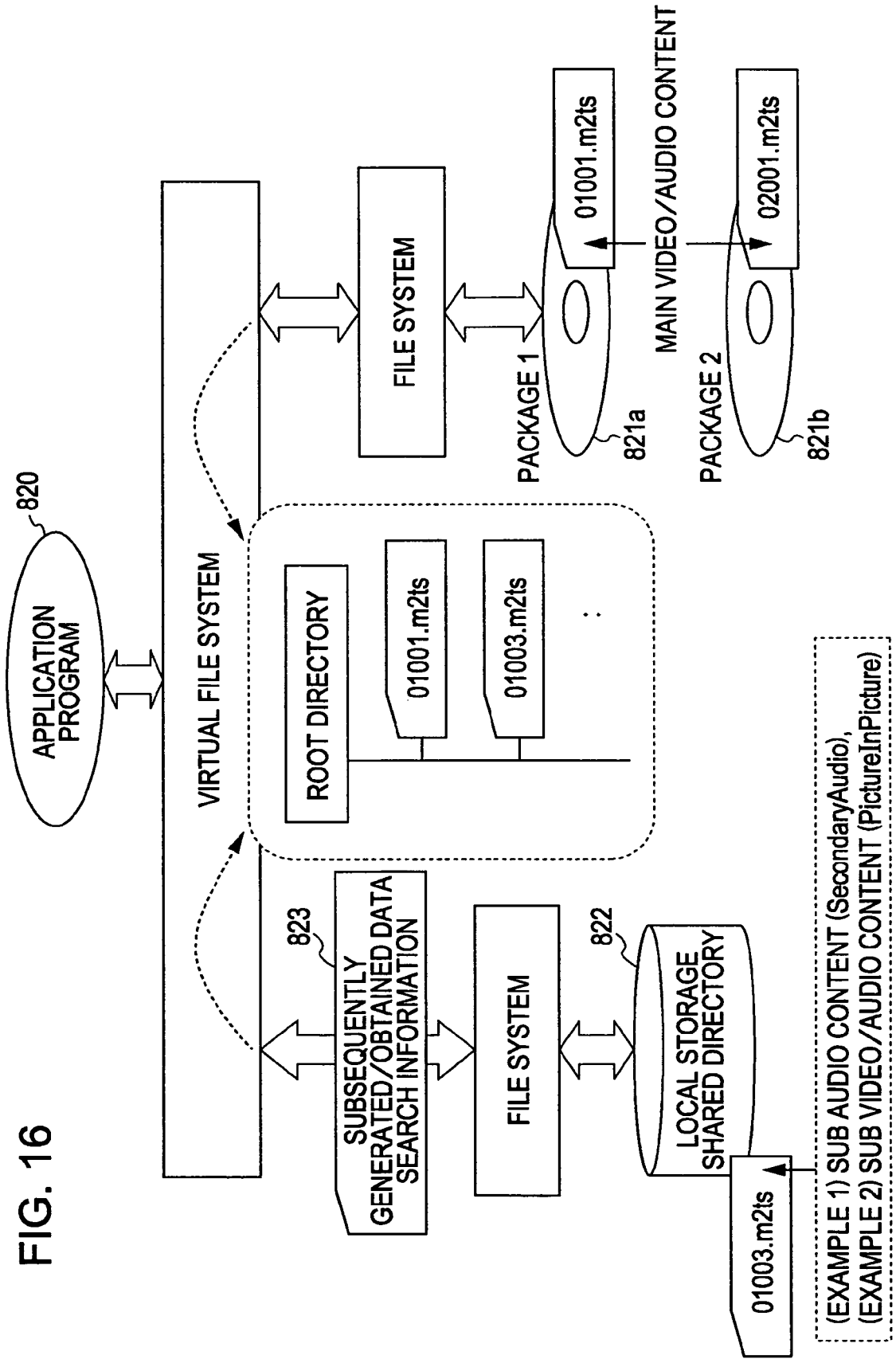
FIG. 16 illustrates parallel playback processing for playing back primary data and secondary data together by using a virtual file system generated by an information processing apparatus.

FIG. 16 illustrates an example of the setting of a virtual directory when parallel playback for primary data and secondary data discussed with reference to FIG. 9 is performed. The application program 820 shown in FIG. 16 is, for example, a movie object, executed by the information processing apparatus.

The application program 820 obtains, via the virtual file system, primary data from a file recorded on an information recording medium 821a belonging to package 1 and secondary data from a file recorded on the local storage 822, and plays back the primary data and the secondary data.

The application program 820 also obtains, via the virtual file system, primary data from a file recorded on an information recording medium 821b belonging to package 2 different from package 1 and secondary data from a file recorded on the local storage 822, and plays back the primary data and the secondary data.

The setting and usage of the subsequently generated/obtained data search information 823, which is search information concerning files recorded on the local storage 822 are described below with reference to FIG. 17. The directories shown in FIG. 17 are file management directories in a general-purpose system file set in the storage unit 803, such as a hard disk or a removable memory, discussed with reference to FIG. 13.

Under the root, an application data directory used by various application programs executed by the information processing apparatus and binding unit directories in which subsequently generated/obtained data associated with CPS units are set. As stated above, subsequently generated/obtained data, such as downloaded data, recorded on a local storage, such as a hard disk, is bound with data recorded on an information recording medium, such as a ROM disc, before starting playback processing, so that a single virtual file system is constructed. Accordingly, the subsequently generated/obtained data is referred to as a "binding unit". All subsequently generated/obtained data to be bound with data on an information recording medium are set in binding unit directories.

Figure 17:
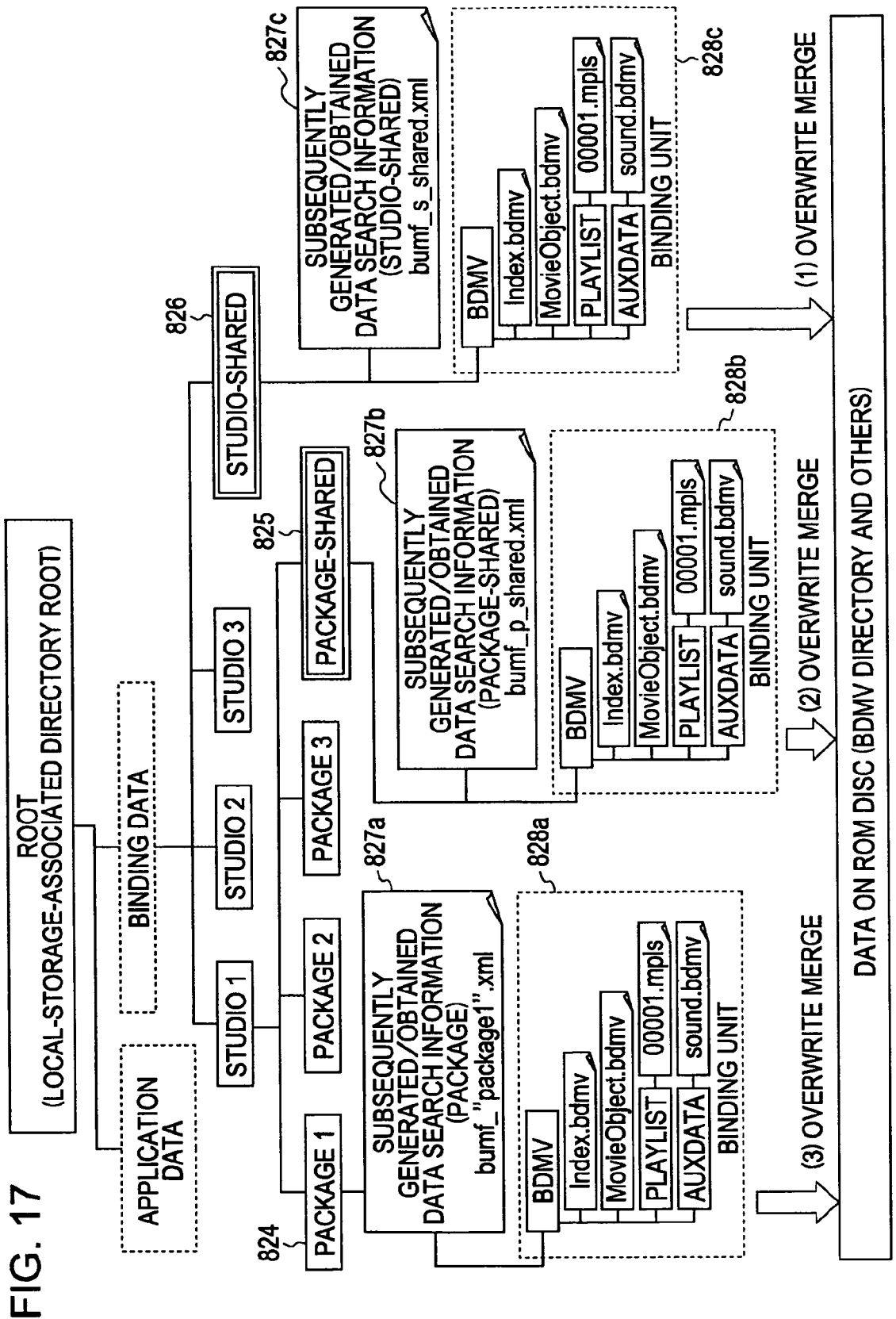
FIG. 17 illustrates an example of the directory structure of a local storage in an information processing apparatus and an example of the setting of subsequently generated/obtained data search information.

In the directory structure shown in FIG. 17, studio directories are set under the binding unit directories, and package directories are set under the studio directories. The directory structure shown in FIG. 17 is the same structure shown in FIG. 13.

Packages 1, 2, and 3 are directories corresponding to discs on which content items corresponding to CPS management units are recorded. In a package-unique directory 824 corresponding to package 1, a subsequently generated/obtained data file associated with content stored in an information recording medium having package ID=1 is set. In the example shown in FIG. 17, a binding unit 828a is set in the package-unique directory 824 as subsequently generated/obtained data. The subsequently generated/obtained data are set as binding units including indexes, movie objects, playlists, and AV data.

Although, in the example shown in FIG. 17, only one binding unit 828a is set in the package-unique directory 824 corresponding to package 1, a plurality of binding units can be set. Subsequently generated/obtained data search information 827a is a search file for data set in the package-unique directory 824 corresponding to package 1.

In the example shown in FIG. 17, under a studio 1 directory, a package 1 directory through a package 3 directory and a package-shared directory 825 are set. In the package-shared directory 825, subsequently generated/obtained data which is used in common for the use of packages (discs) corresponding to studio 1 is set.

For example, if movie production company A stores many items of content in corresponding ROM discs to be provided to users, it associates unique subsequently generated/obtained data with each ROM disc. Those package-unique subsequently generated/obtained data, for example, subtitle data, are recorded as binding units set in the corresponding package 1 directory through package 3 directory. It is preferable, however, that movie previews or other service data, which are not necessary to be associated with specific content, can be used when playing back content stored in any ROM disc provided by movie production company A. Such data are stored in a biding unit 828b set in the package-shared directory 825. Subsequently generated/obtained data search information 827b is a search file for data set in the package-shared directory 825. Accordingly, since ROM discs have different unit keys, the same unit key as the unit keys for the ROM discs cannot be used for data set in the package-shared directory 825.

In the example shown in FIG. 17, under the binding unit data directories, the studio 1 directory through studio 3 directory and a studio-shared directory 826 are set. In the studio-shared directory 826, subsequently generated/obtained data used in common for the use of packages (discs) stored in the studio 1 through studio 3 are stored.

For example, if a plurality of movie production companies A through C store content in ROM discs and provide them to users, it is preferable that data which is not necessary to be associated with specific movie production companies, for example, service data and commercial content, be used when playing back content stored in any ROM disc without depending on the movie production companies. Such data are stored in a binding unit 828c set in the studio-shared directory 826. Subsequently generated/obtained data search information 827c is a search file for data set in the studio-shared directory 826.

For example, if a disc having package ID=1 is installed in the information processing apparatus, subsequently generated/obtained data that can be used includes the binding unit 828a set in the package-unique directory 824 associated with package 1, the binding unit 828b set in the package-shared directory 825, and the binding unit 828c set in the studio-shared directory 826.

In the virtual file system discussed with reference to FIGS. 15 and 16, the data set in the three different binding units 828a through 828c are merged with the data stored in the information recording medium to set a virtual file. As stated above, when a disc is installed in the information processing apparatus or when the application program is started, a virtual file system is created by merging the file system of the disc with the file system of the local storage. The created virtual file system is stored in the memory of the information processing apparatus.

There may be a plurality of binding units to be merged, such as those shown in FIG. 17:

(1) binding unit 828c set in the studio-shared directory 826;

(2) binding unit 828b set in the package-shared directory 825; and (3) binding unit 828a set in the package-unique directory 824 associated with package 1.

Those binding units (1) through (3) are merged in the order of (1)→(2)→(3), and if the same file name exists, it is overwritten by the next file. According to this merge operation, priority is given to a package-unique file, a package-shared file, and a studio-shared file in the descending order.

The data structure of a subsequently generated/obtained data search information file is discussed below with reference to FIG. 18. A file used for searching for subsequently generated/obtained data stored in a local storage, such as a hard disk, is a subsequently generated/obtained data search information file.

Figure 18:
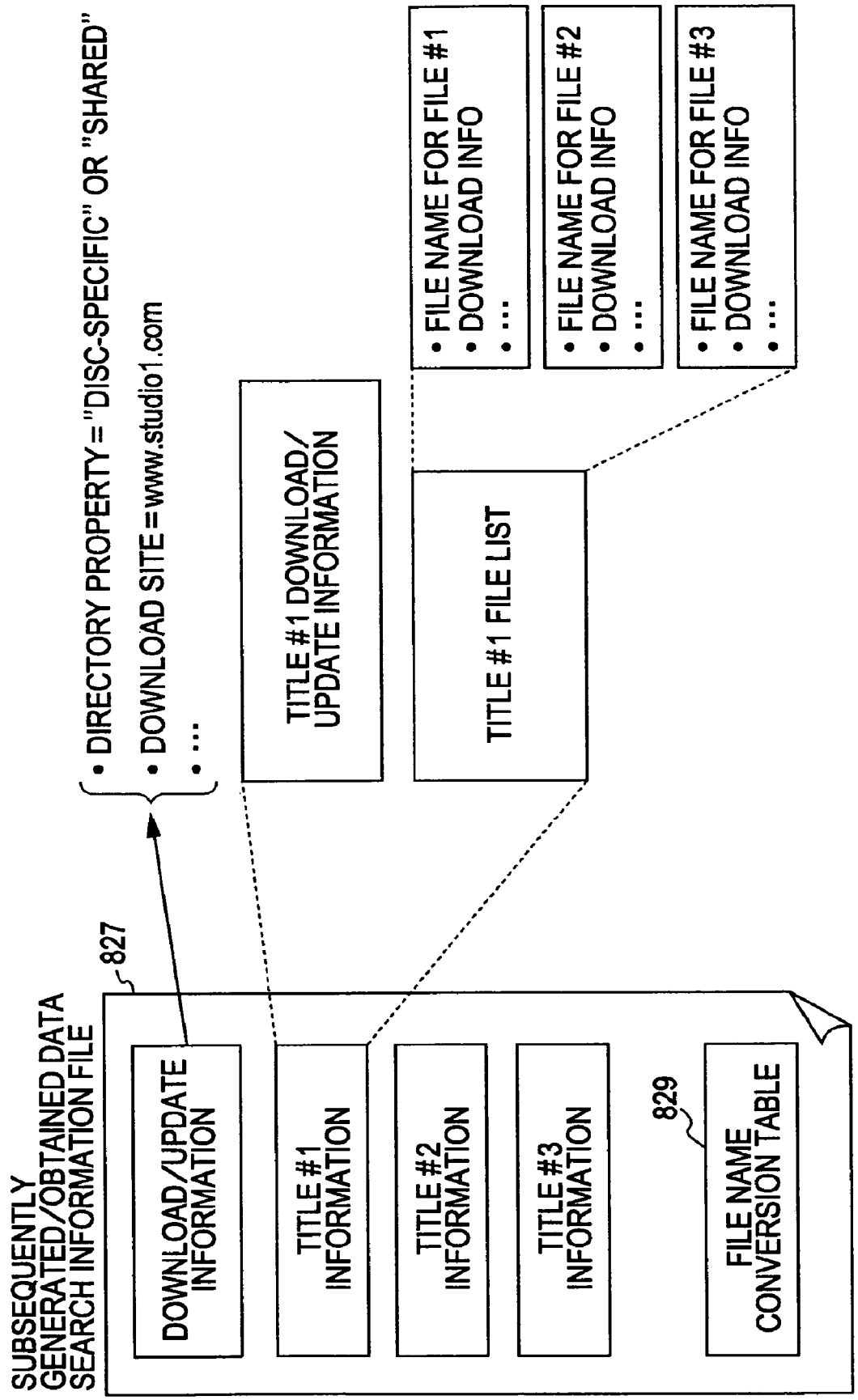
FIG. 18 illustrates an example of the data structure of subsequently generated/obtained data search information.

In a subsequently generated/obtained data search information file 827, as shown in FIG. 18, directory property information, download site information, and information concerning files stored in the directories, such as title-associated download/update information and title-associated information concerning title-associated file lists, are stored. In the title-associated file lists, the file names of title-associated subsequently generated/obtained data and download information are stored. An application that plays back content obtains the file name of a necessary file on the basis of the title and selects data on the basis of the file name.

In the subsequently generated/obtained data search information file 827, a file name conversion table 829 is also stored. The configuration of the file name conversion table 829 is discussed below with reference to FIG. 19.

The file name of a subsequently generated/obtained data file set in the studio-shared directory 826 shown in FIG. 17 is a file name set by a data providing studio that provides subsequently generated/obtained data. Without certain rules, therefore, it is possible that the same file name be set. It is thus necessary to determine predetermined rules for setting the file names and then to store subsequently generated/obtained data files with the file names that are set in accordance with the rules.

For example, one measure to avoid duplications of file names is to share information among users. When producing content using a shared directory, a user can apply for a management entity to obtain usage rules of a specific file name. For example, to store downloaded AV stream files in a shared directory, the user can apply for a management entity to obtain the usage rules of specific different file names, such as 001XX.m2ts and 001XX.clpi.

Another measure is to set the studio name of a studio that provides subsequently generated/obtained data and to store the subsequently generated/obtained data in a shared directory. For example, for subsequently generated/obtained data associated with studio A, the following studio names are set:

studioA.STREAM.00001.m2ts studioA.CLIPINF.00001.clpi.

For subsequently generated/obtained data associated with studio B, the following studio names are set:

studioB.STREAM.01001.m2ts studioB.CLIPINF.01001.clpi.

However, if such a studio name is set in a file name in a virtual file created by the above-described merge processing, the file name may become different from the file name that can be used by a playback processing application, in which case, it is difficult to use subsequently generated/obtained data.

To overcome this drawback, the file name conversion table shown in FIG. 19 is used. That is, the file name conversion table 829 is recorded in the subsequently generated/obtained data search information file 827, and when performing merge processing for generating a virtual file, the file name conversion table 829 is checked to determine the file name set in the virtual file.

In the file name conversion table 829 shown in FIG. 19, the local storage file name, studio ID, package ID, and converted file name are associated with each other.

The local storage file names are the actual file names to be recorded on a local storage that stores subsequently generated/obtained data. The local storage file names are provided with, for example, studio names, so that duplications of file names can be avoided.

The file name conversion processing is determined by the studio ID and package ID associated with content to be played back. When executing playback processing, data in an information recording medium, such as a ROM disc, and subsequently generated/obtained data are bound. Studio IDs and package IDs are associated with all subsequently generated/obtained data. An information processing apparatus that plays back content obtains the studio ID and package ID associated with content to be played back, and obtains the converted file name by using the file name conversion table on the basis of the studio ID and package ID, and sets the obtained file name in the virtual file system.

For example, if the local storage file name is studioA.STREAM.00001.m2ts and if the studio ID is 1 and the package ID is 1, 2, or 3, the converted file name is BDMV/STREAM/00001.m2ts, which can be used in a playback application.

In this manner, by converting file names by using the file name conversion table, desired file names can be set in a directory of a local storage. As a result, duplications of file names can be prevented.

The local storage file names of both the second and third entries from the bottom of the file name conversion table shown in FIG. 19 are studioC.STREAM.00002.m2ts.

The converted file name of the file having the studio ID=1 and the package ID=1, 2, or 3 is BDMV/STREAM/00002.m2ts, and the converted file name of the file having the studio ID=2 and the package ID=4, 5, or 6 is BDMV/STREAM/00012.m2ts. Accordingly, the same local storage file name can be converted into different file names in accordance with the studio ID and the package ID. By performing the file name conversion processing with the file name conversion table, different file names to be used in different playback applications can be set.

The file name conversion table 829 may be stored in the subsequently generated/obtained data search information file of a shared directory, such as the studio-shared directory 826 or the package-shared directory 825. Alternatively, the file name conversion table 829 may be stored in a subsequently generated/obtained data search information file set in a package ID directory. Unlike a shared directory, files under a package ID directory are under the total control of one studio. Accordingly, file names are given to the files such that they can be easily handled, and when a virtual file system is constructed, the file names are converted into file names (e.g., XXXXX.m2ts) in compliance with a format that can be interpreted by a playback application.

The directory structure shown in FIG. 17 has three different lower directories, such as (1) a studio-shared directory, (2) a package-shared directory, and (3) a package-unique directory. However, a directory structure without a shared-directory, i.e., a studio-shared directory or a package-shared directory, is possible.

7. Content Usage Control Based on Strict Verification Processing

Content usage control based on strict verification processing is described below. Data stored in a storage unit, such as a hard disk or a removable memory, and to be bound with data stored in an information recording medium, such as a ROM disc, is set in a file management directory, such as that shown in FIG. 17, and is bound with the data in the information recording medium before starting playback processing so that a virtual file system, such as that discussed with reference to FIGS. 15 and 16, can be created.

In data stored in a local storage, such as a hard disk, as discussed with reference to FIG. 17, a package-unique directory that can be used only when a disc with a specific package ID is used, a studio-unique directory that can be used only when a disc with a specific studio ID is used, a package-shared directory that can be used in common for discs with different package IDs, and a studio-shared directory that can be used in common for discs with different studio IDs are set.

To use the data stored in the local storage, an information processing apparatus reads the package ID or the studio ID from a disc installed in the information processing apparatus, and selects usable data on the basis of the read ID. That is, the data stored in a package-unique directory in the local storage can be used only when a disc having the package ID associated with the package-unique directory is installed. If a disc having a different package ID is installed, the use of the data stored in the associated package-unique directory is rejected. A determination as to whether to permit the use of data in the local storage is made by a playback application to be started when using content in the information processing apparatus. Similarly, the data stored in a studio-unique directory in the local storage can be used only when a disc having the studio ID associated with the studio-unique directory is installed. If a disc having a different studio ID is installed, the use of the data stored in the associated studio-unique directory is rejected.

A description is now given of the configuration to allow the reliable usage control for content stored in a local storage on the basis of IDs, such as studio IDs or package IDs. Data stored on a local storage and set in a file management directory, such as that shown in FIG. 17, is bound with data stored in an information recording medium, such as a ROM disc, so that a virtual file system, such as that discussed with reference to FIGS. 15 and 16, is created. Data stored in a local storage that can be bound with data in an information recording medium is defined by the studio ID or the package ID associated with the data stored in the information recording medium.

After constructing a virtual file system, however, it is possible that the studio IDs and the package IDs read from a disc and set in the virtual file system be tampered by the information processing apparatus. If IDs are tampered, unauthorized use of data in a local storage may occur.

When setting a virtual file system, studio IDs or package IDs may be read from a disc and set in the virtual file system. Such ID information can be easily output to an external source, and it is possible that the ID information be copied onto another disc, and an unauthorized disc can be created. In this manner, by setting an unauthorized disc storing studio IDs or package IDs copied from an authorized disc in an information processing apparatus, the studio IDs or package IDs can be read from the unauthorized disc to play back or use studio-unique or package-unique content stored in a local storage.

Figure 20:
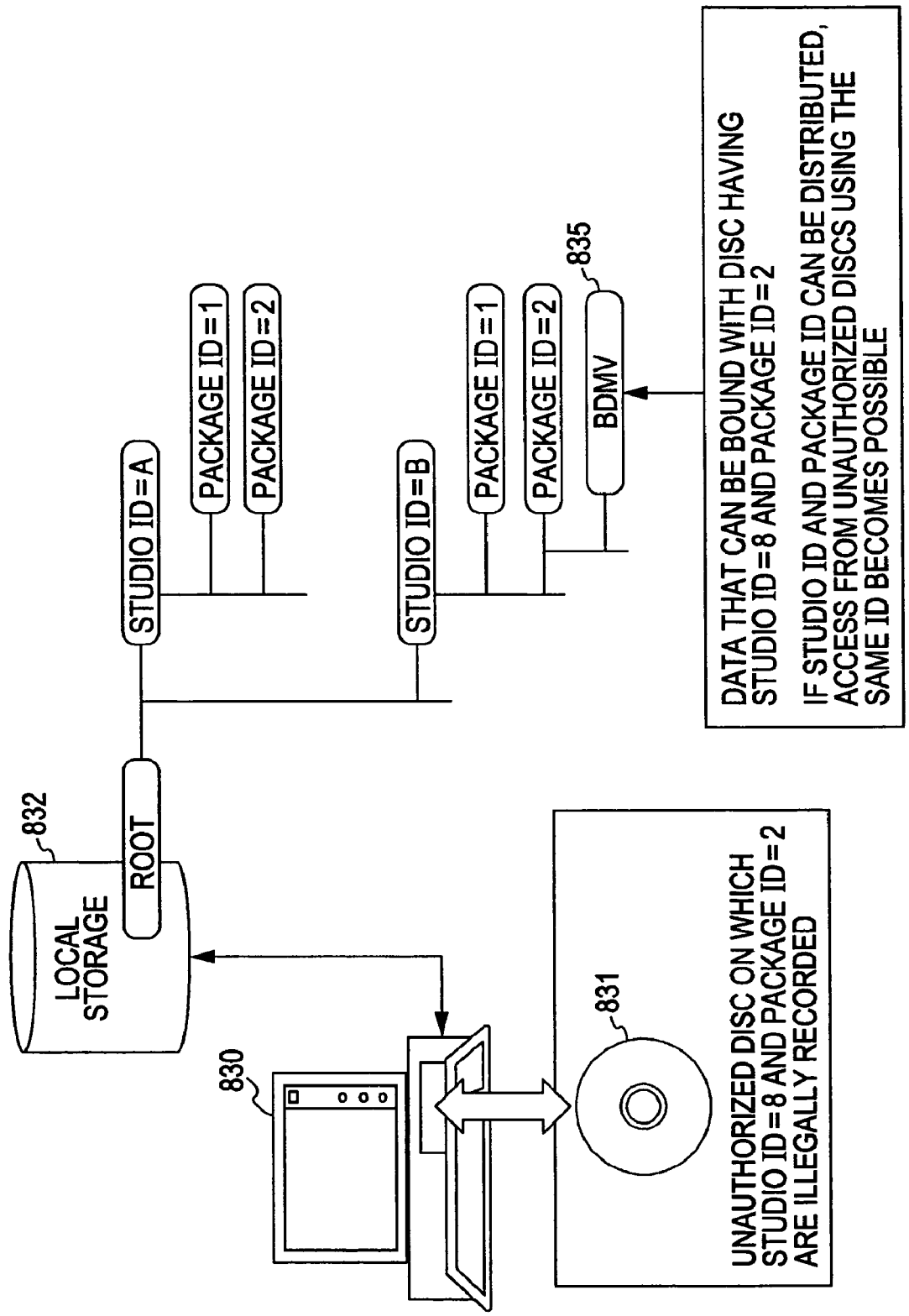
FIG. 20 illustrates unauthorized use of data stored in a local storage.

A specific example is discussed below with reference to FIG. 20. For example, an unauthorized disc 831 into which studio ID=B and package ID=2 are illegally written is installed in an information processing apparatus 830 that plays back content. It is assumed that the information processing apparatus 830 has received subsequently generated/obtained data from a server and stored it in a local storage 832. The directories of data stored in the local storage 832, similar to those shown in FIG. 17, are shown in FIG. 20. Although the directories shown in FIG. 17 are spread horizontally, the directories shown in FIG. 20 are spread vertically.

In a BDMV directory 835 shown in FIG. 20, data that can be bound with a disc having studio ID=B and package ID=2 is set. The information processing apparatus 830 in which the unauthorized disc 831 having studio ID=B and package ID=2 is installed can use the data set in the BDMV directory 835.

Even if data to be subjected to usage control based on studio IDs or package IDs is stored in a local storage, it becomes difficult to protect or control the use of content stored in the local storage if such IDs are illegally copied.

Strict protection, such as encryption or usage control, can be conducted on such IDs as well as content stored in a disc. In this case, however, complicated procedures are necessary in a studio or a manufacturing factory where IDs are set, thereby decreasing the flexibility in the setting of IDs.

A description is given below of a relatively simple configuration that prevents the unauthorized use of content, in particular, content stored in a local storage, due to unauthorized use of IDs, such as studio IDs and package IDs, while maintaining the flexibility in the setting of the IDs without the need for strict verification processing.

To prevent the unauthorized use of IDs, such as studio IDs and package IDs, the IDs set in a virtual file system should be protected from tampering. More specifically, data stored in an information recording medium, such as a ROM disc, on which studio IDs and package IDs are recorded together with content, is set, as shown in FIG. 21.

Figure 21:
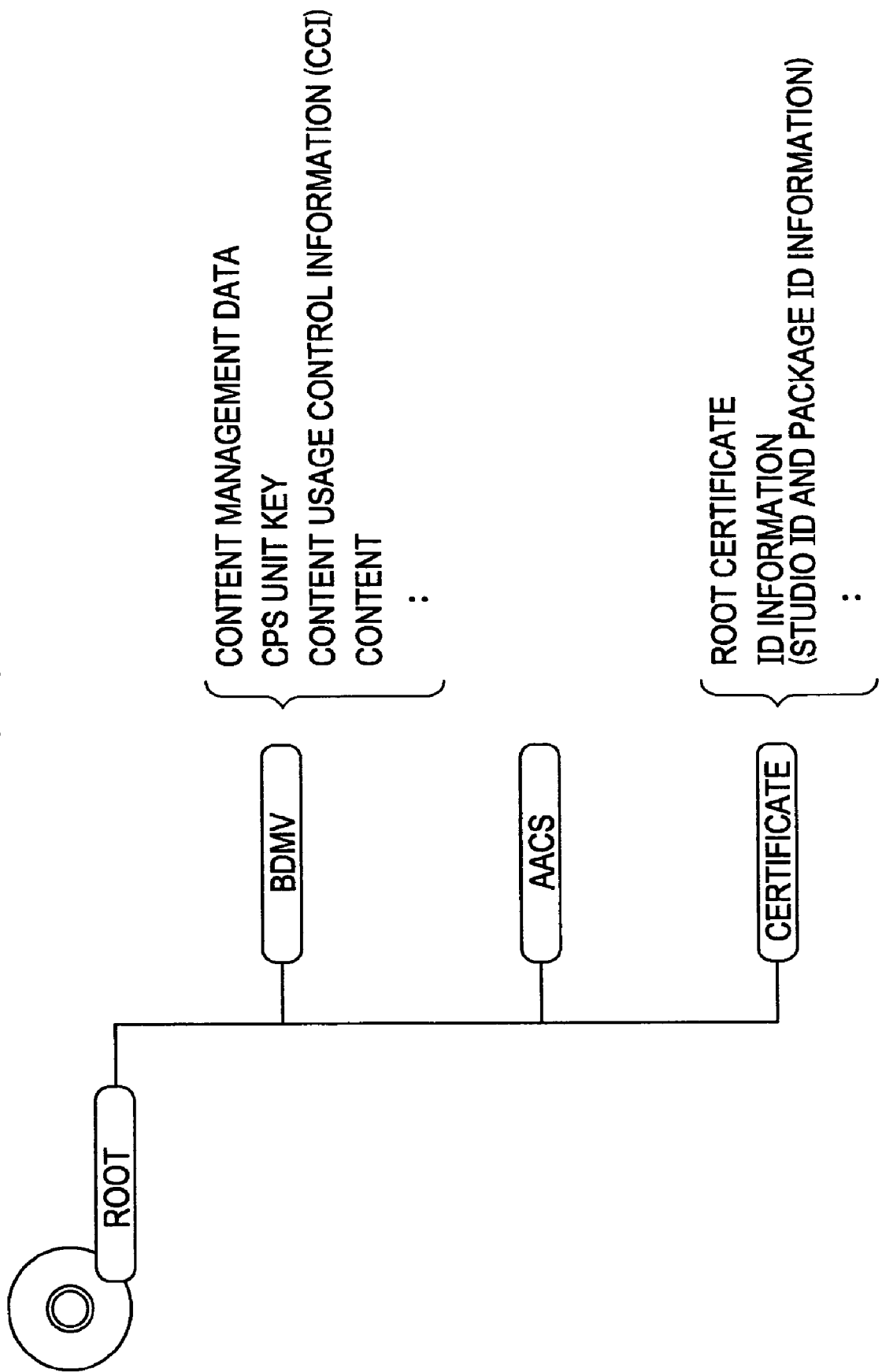
FIG. 21 illustrates a directory structure of data stored in an information recording medium.

FIG. 21 illustrates the overall directory structure of data stored in an information recording medium. The data stored in the information recording medium is largely divided into three data: a BDMV directory in which content-related data, such as content management data, CPS unit keys, content usage control information (CCI), and content, are set; an advanced access content system (AACS) directory in which a content certificate for certifying the integrity of content provided by a content management system (AACS) is set; and a certificate directory in which a root certificate corresponding to a public key certificate storing a public key for verifying a signature set in a Java application file, which is set in the BDMV directory, is set. The root certificate is, for example, a public key certificate.

ID information, such as studio IDs and package IDs, is set in the certificate directory. When a virtual file system, such as that discussed with reference to FIGS. 15 and 16, is constructed, only data set in the BDMV directory, which is a content setting directory, can be used as data forming the virtual file system, and data set in the AACS directory and the certificate directory are not used as data forming the virtual file system. Accordingly, it is difficult for an information processing apparatus to read or write data other than data set in the BDMV directory, from or into the virtual file system so that the unauthorized use of content due to tampering of IDs can be prevented.

It is preferable that, in addition to this directory structure, the protection and verification of tampering of IDs be conducted. The structure that satisfies this demand is discussed below. Details of data set in the BDMV directory, AACS directory, and certificate directory are described below with reference to FIGS. 22 through 24.

Figure 22:
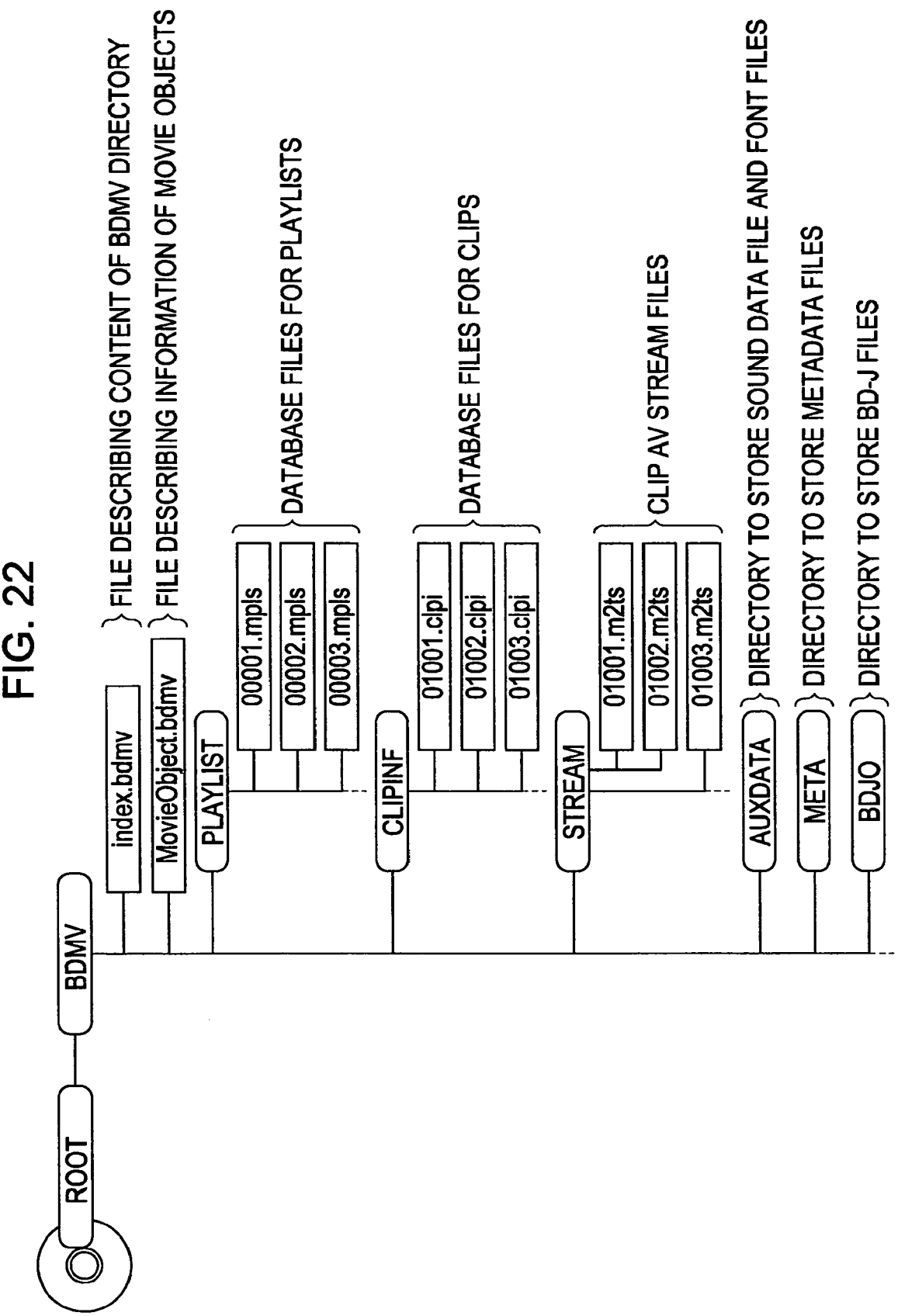
FIG. 22 illustrates a BDMV directory structure for setting data in an information recording medium.

FIG. 22 illustrates details of the BDMV directory in which content-related data is set. In this BDMV directory, indexes, movie objects, playlists, and clips of content having a hierarchical structure discussed with reference to FIG. 3 are set as individual files, and are stored in an information recording medium in accordance with, for example, the directory structure shown in FIG. 22. The files stored in the information recording medium are, for example, as follows:

(A) index.bdmv file corresponding to the index layer 210, such as the title 211, shown in FIG. 3;

(B) Movieobject.bdmv file corresponding to the movie object layer 220, such as the playback program (movie object) 221, shown in FIG. 3;

(C) files under a PLAYLIST directory corresponding to the playlist layer 230 shown in FIG. 3;

(D) files under a CLIPINF directory and files under a STREAM directory corresponding to the clip layer 240 shown in FIG. 3, the files under the CLIPINF directory and the STREAM directory shown in FIG. 20 being associated with the clips and the streams shown in FIG. 3 according to the same file numbers; and (E) other files, such as an AUXDATA file storing sound data and font data, a META file storing metadata, and a BDJO file storing BD-J objects.

Figure 23:
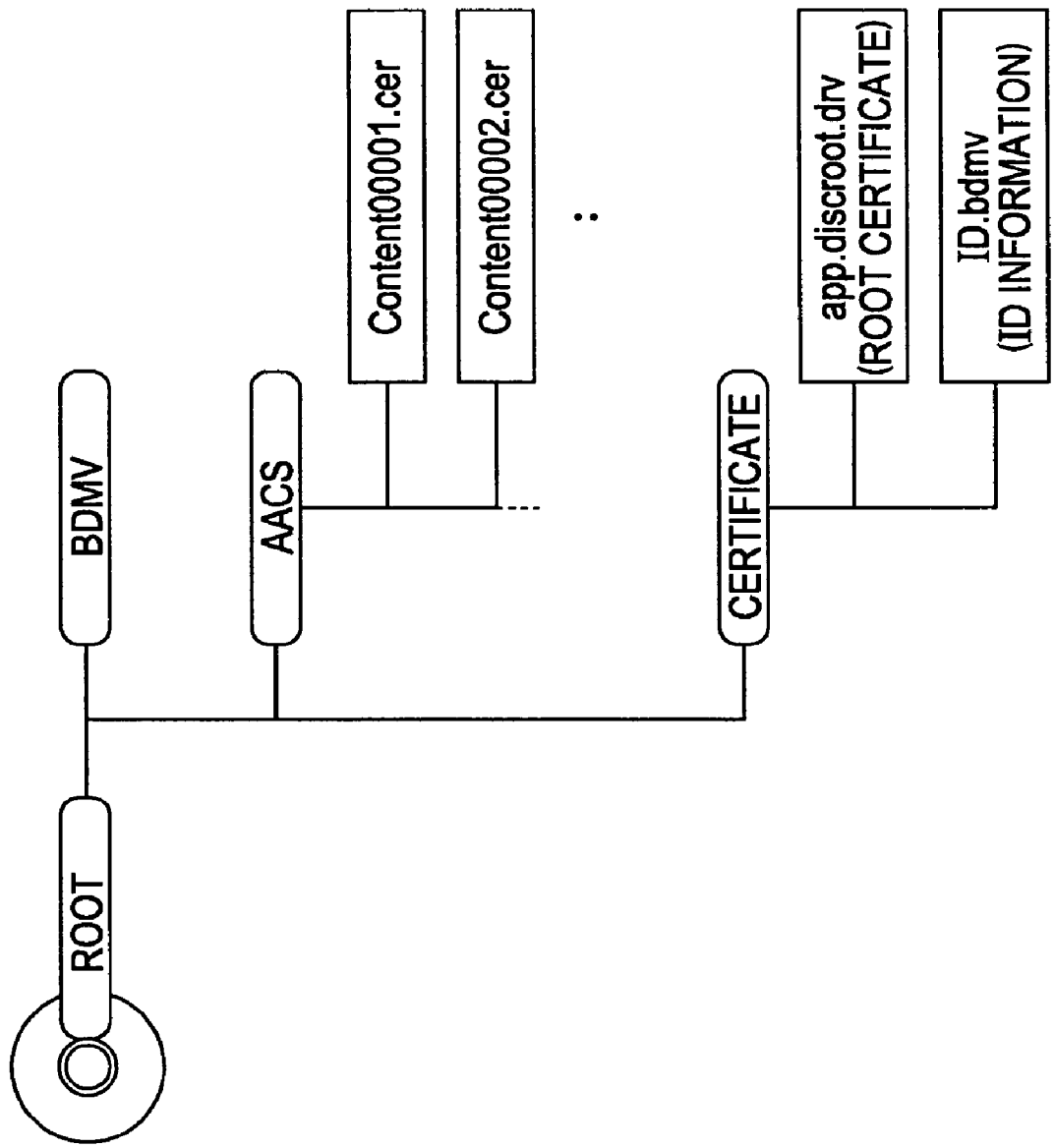
FIG. 23 illustrates an AACS directory structure for setting data stored in an information recording medium and a certificate directory structure.

Details of data set in the AACS directory and in the certificate directory are discussed below with reference to FIGS. 23 and 24. In the AACS directory, a content certificate for certifying the integrity of content provided by a content management system (AACS) is stored.

The data configuration of the content certificate for verifying the integrity of content set in the BDMV directory is shown in FIG. 24. The content certificate includes, as shown in FIG. 24, the following data:

header: indicating that this data is a content certificate;

content hash table digest: the hash value of a table in which the hash value based on part of the data forming the content is registered;

root certificate hash: the hash value of the root certificate set in the certificate directory; and signature: signature of a management entity (for example, a key management center) that issues the content certificate.

The hash value in the content hash table digest is data for verifying the integrity of content, e.g., whether content set in the BDMV directory has been tampered with.

The root certificate hash is the hash value of the root certificate set in the certificate directory, and represents a unique value associated with a specific root certificate. The application of hash values of root certificates is described in the following section.

To execute processing by referring to those hash values, the verification of the signature of the content certificate is first conducted to check that the tampering of the content certificate itself has not been conducted. The content certificate may also include other data, such as the content provider ID, content ID, and disc factory ID.

The root certificate [app.discroot.drt] set in the certificate directory corresponds to a public key certificate in which a signature-verifying public key for verifying the integrity of content set in the BDMV directory, such as a Java application file, is stored.

Figure 25:
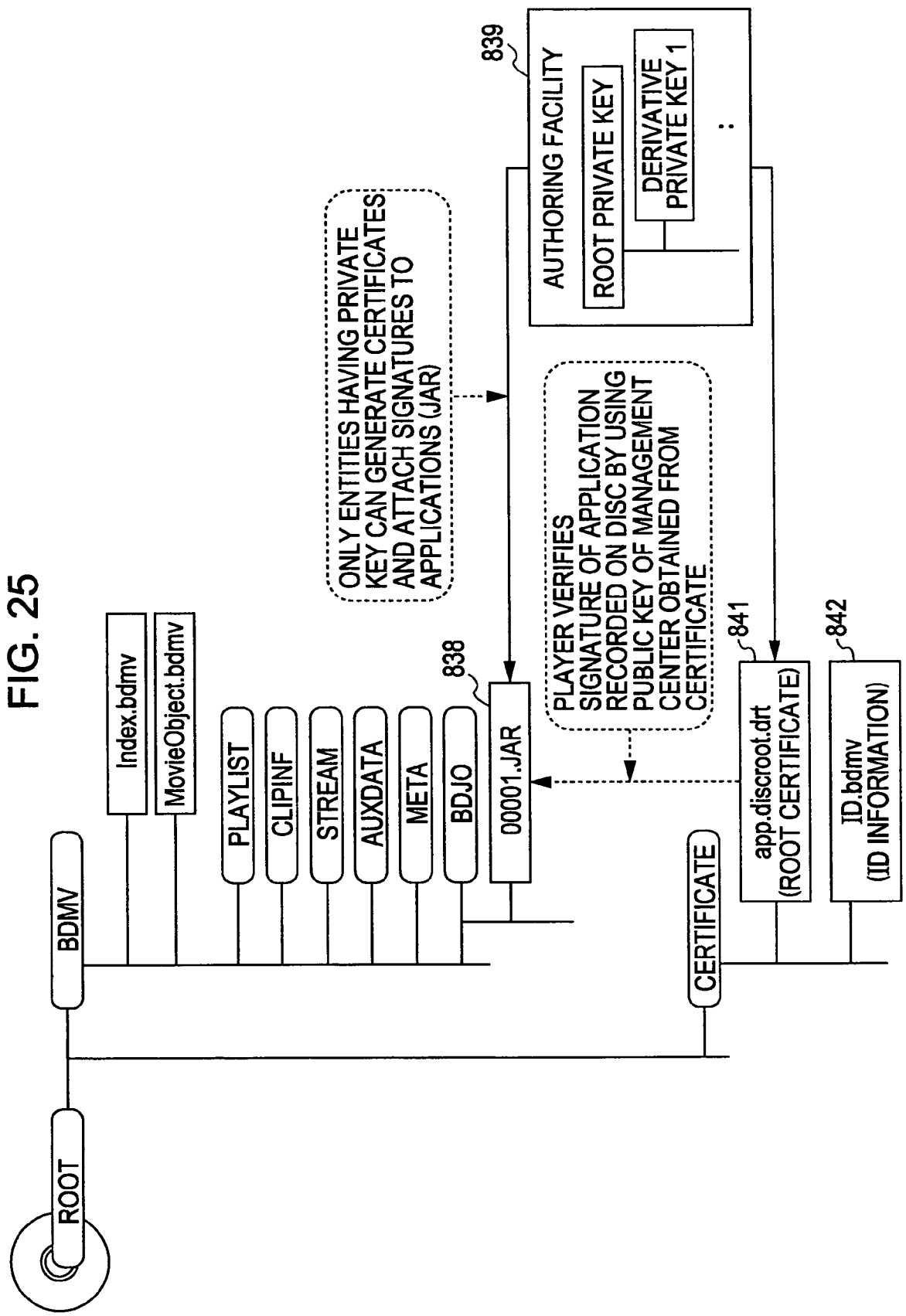
FIG. 25 illustrates details of a root certificate.

Details of the root certificate [app.discroot.drt] are discussed below with reference to FIG. 25. The directories shown in FIG. 25 are directories corresponding to data stored in an information recording medium storing authorized content therein. As discussed above, in the data shown in FIG. 25, the BDMV directory, the AACS directory, and the certificate directory are set.

In the certificate directory, a root certificate [app.discroot.drt] 841 and ID information 842 are set.

The root certificate [app.discroot.drt] 841 corresponds to a public key certificate in which a public key for verifying the signature attached to content, for example, a Java application file [00001.JAR] 838, set in the BDMV directory is stored. In the Java application file [00001.JAR] 838, a signature is set by using a private key of an authoring facility 839 shown in FIG. 25. As the private key for the signature of the Java application file [00001.JAR] 838, instead of directly using the original private key of the authoring facility 839, a derivative private key generated on the basis of the private key used for generating the signature of the root certificate 841 is generally used. The number of uses of the private key for generating a derivative private key is restricted to, for example, three.

The public key for verifying the signature of the Java application file [00001.JAR] 838 is stored in the root certificate [app.discroot.drt] 841, which serves as the public key certificate.

The public key certificate stores, not only the public key of the authoring facility 839, but also other various data, such as issuance time and date information, effective period information, and version information. Although there are many public key certificates that store the same public key, overall data stored in the public key certificates are different. Accordingly, the root certificate hash value stored in the content certificate discussed with reference to FIG. 24 is the unique value associated with a specific public key certificate.

The certificate directory also stores the ID information [id.bdmv] 842, such as the studio ID and package ID. An example of the data structure of the ID information [id.bdmv] 842 is shown in FIG. 26. The ID information file includes, as shown in FIG. 26, the following data:

file identifier: character string [BDID] indicating that this information is ID information;

version number: the version of the associated format;

organization ID: studio ID; and disc ID: package ID.

In the ID information file shown in FIG. 26, the studio ID and the package ID are indicated by Organization_ID and Disc_ID, respectively. This is merely due to the indication of the file, and, in fact, the studio ID and the package ID are filled in the two fields.

By setting the studio ID and the package ID in the certificate directory as described above, the IDs are not set in a virtual file system created by data in an information recording medium and data in a local storage. As a result, tampering of the IDs in the virtual file system by an information processing apparatus can be prevented.

The association between data stored in an authorized information recording medium, such as a ROM disc, in particular, the association between the root certificate and other data, is described below with reference to FIG. 27.

Figure 27:
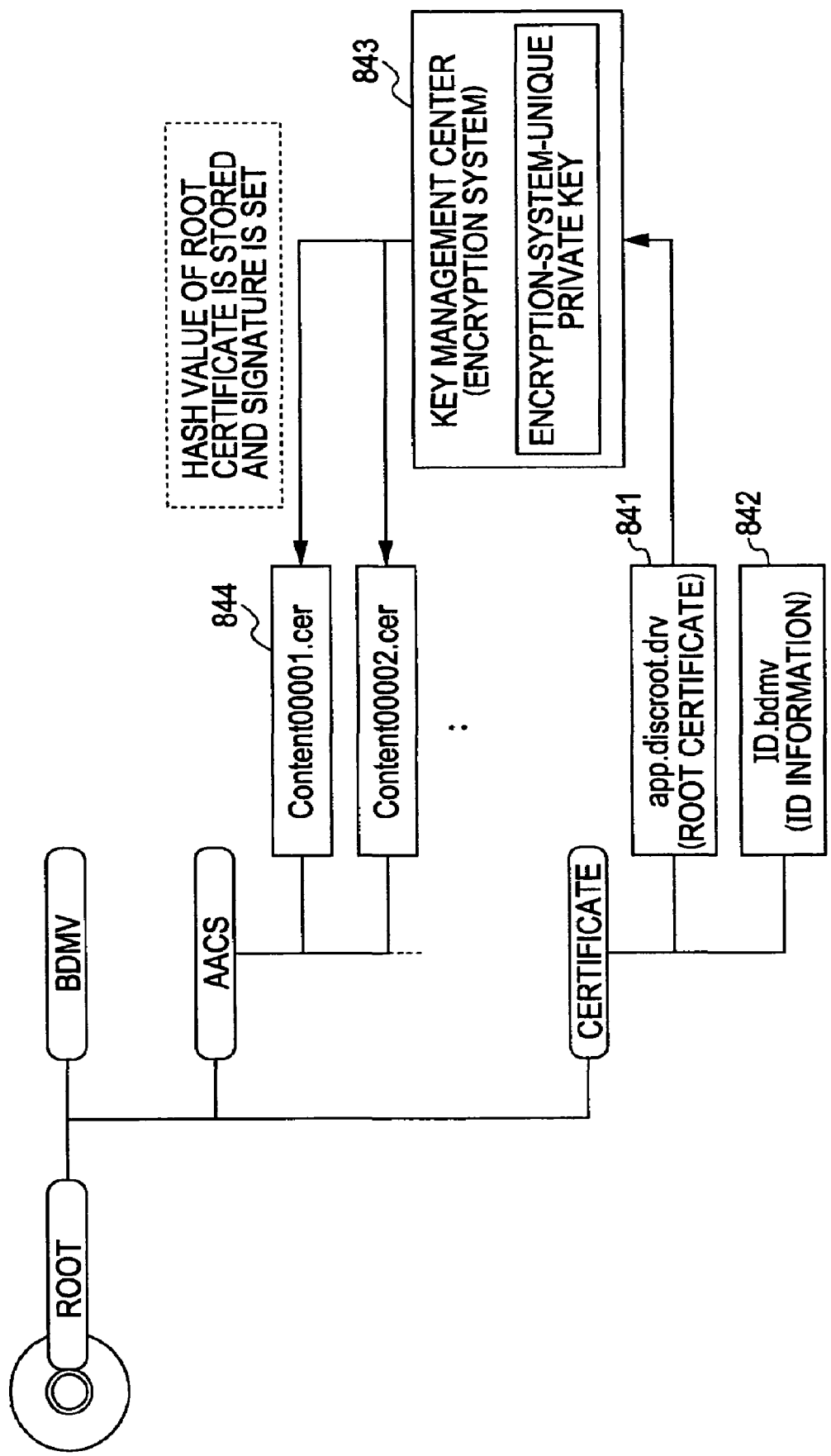
FIG. 27 illustrates the association between a content certificate and a root certificate.

FIG. 27 illustrates the relationship between the content certificate shown in FIG. 24 and the root certificate and generation processing for the root certificate. The directories shown in FIG. 27 are directories set in an authorized information recording medium, such as a ROM disc. In the information recording medium, as discussed above, directories, such as the BDMV directory, the AACS directory, and the certificate directory, are set.

The certificate directory includes the root certificate [app.discroot.drt] 841 and the ID information 842.

The root certificate 841 corresponds to a public key certificate in which the public key of the authoring facility 839 shown in FIG. 25 is stored, and also stores unique information, such as the issuance time and date information and the version number. That is, data stored in discs are different depending on the disc. The hash value of the root certificate 841 is stored in a content certificate 844 as the certificate for the content to be stored in the disc. The content certificate is set for each piece of content stored in a disc, i.e., each piece of content set in the BDMV directory. If a plurality of pieces of content are set in a disc, the same number of content certificates as the number of pieces of content are set in the AACS directory, and the hash value of the root certificate is stored in each content certificate.

In this manner, in the content certificate, the hash value of a root certificate which is stored after being subjected to processing by a key management center is stored. This hash value is a unique value for a certain disc, and is different from the hash value of a root certificate stored in a content certificate of another disc.

To use content, as stated above, an information processing apparatus constructs a virtual file system by binding content stored in a local storage with content stored in an information recording medium. In this case, before the use of content, the information processing apparatus first obtains the content certificate corresponding to content to be bound from the AACS directory, and verifies the integrity of the signature of the obtained content certificate. After verifying that the content certificate has not been tampered with, the information processing apparatus obtains the hash value of the root certificate stored in the content certificate.

Then, the information processing apparatus obtains the root certificate 841 set in the certificate directory and calculates the hash value of the root certificate. The information processing apparatus then compares the calculated hash value with the hash value stored in the content certificate obtained from the AACS directory. If the two hash values coincide with each other, it has been proved that the root certificate and the content certificate are data recorded on the same authorized disc. In this case, the information processing apparatus constructs the above-described virtual file system to permit the use of the content in the local storage and the content in the information recording medium.

If the two hash values do not coincide with each other, it is determined that the root certificate and the content certificate are not data recorded on the same disc, and at least one of the root certificate and the content certificate is unauthorized data, such as that illegally copied from another disc. Thus, the use of the content is not permitted. That is, the construction of the above-described virtual file system is discontinued, and the use of the content in the local storage and the content in the information recording medium is not permitted.

The above-described series of checking processing are executed by an application of an information processing apparatus to play back content before binding the content in an information recording medium with data in a local storage and constructing a virtual file system. After verifying the coincidence of the two hash values as a result of checking processing, content data to be bound is obtained from the BDMV directory, and a virtual file system is constructed.

In this manner, the use of data stored in a local storage is permitted on the condition that the hash value calculated on the basis of the root certificate coincides with the hash value of the root certificate stored in the content certificate, thereby making it possible to effectively prevent the unauthorized use of the content in the local storage.

Figure 28:
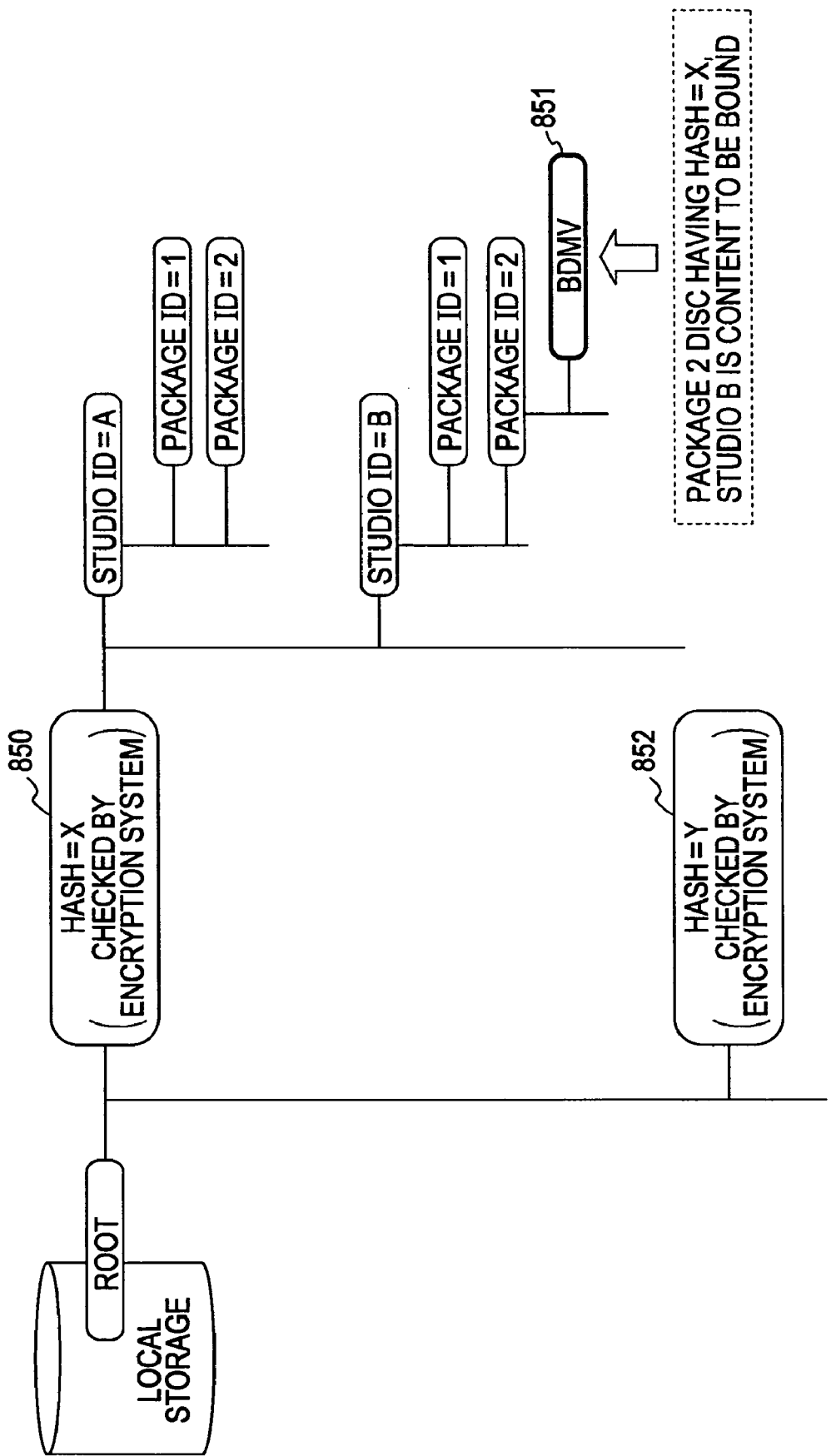
FIGS. 28 and 29 illustrate usage control processing for content stored in a local storage by using a content certificate and a root certificate.

A determination as to whether the use of content in a local storage, such as a hard disk, is permitted is described below with reference to FIG. 28. The directories shown in FIG. 28 are the directories in a local storage, such as a hard disk, and correspond to the directories discussed with reference to FIG. 17. Data stored in a local storage includes a package-unique directory only for a disc provided with a specific package ID, a studio-unique directory only for a disc provided with a specific studio ID, a package-shared directory in common for the use of discs provided with different package IDs, and a studio-shared directory in common for the use of discs provided with different studio IDs.

Content set in a BDMV directory 851 shown in FIG. 28 is provided with studio ID=B and package ID=2, and can be used only when a disc provided with those IDs is installed in an information processing apparatus, and can be bound with the content stored in this disc.

An information processing apparatus that uses the content set in the BDMV directory 851 determines whether the following conditions (1) and (2) are satisfied:

(1) coincidence between the hash value of the root certificate stored in a content certificate in a disc and the hash value calculated on the basis of the root certificate; and (2) coincidence between the studio ID and the package ID set in the ID information of the disc (see FIG. 26) and the IDs set in the directories of the local storage. Only when the conditions (1) and (2) are satisfied, the information processing apparatus binds the data stored in the BDMV directory of the disc with the content stored in the BDMV directory 851 in the local storage to construct the above-described virtual file system to use the content.

A hash=X directory 850 shown in FIG. 28 is set as a directory in which data to be bound with the content stored in a disc having only one specific root certificate is stored. A hash=Y directory 852 is set as a directory in which data to be bound with the content in a disc having a root certificate having hash=Y different from the root certificate in the hash=X directory 850 is stored. The hash=Y directory 852 can be used only when a disc storing a root certificate having hash=Y is installed.

In the case of a disc which is not subjected to an encryption system, the use of a content certificate provided by an encryption system cannot prevent the unauthorized distribution of a root certificate. To handle a disc which is not subjected to an encryption system, even if the hash value of the root certificate is X, the content stored in the information recording medium is not bound with the data stored in the directory having hash=X (checked by an encryption system) in the local storage. Instead, a mechanism in which the content stored in the information recording medium is bound with an extra directory having hash=X (not checked by an encryption system) 853 (see FIG. 29) is necessary.

In this manner, in a local storage, it is necessary to set directories that require the checking of hash values in distinction from directories that do not require the checking of hash values. In the case of directories storing content that require the checking of hash values, content to be bound with a disc having a hash value is set in a directory different from a directory for another content to be bound with another disc having another hash value.

Figure 29:
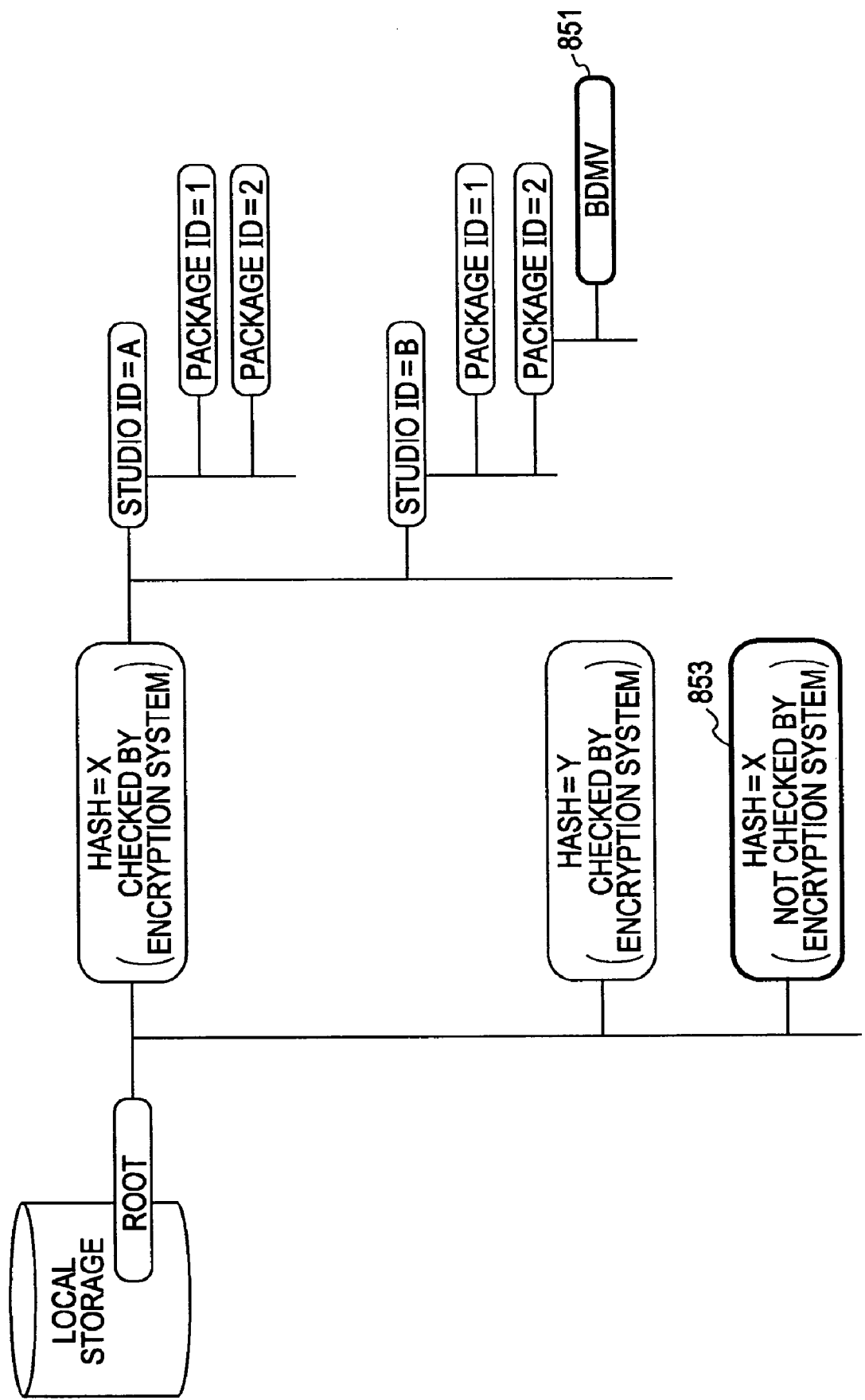

For example, to use the content set in the BDMV directory 851 having studio ID=B and package ID=2 shown in FIG. 29, it is necessary to check the coincidence between the hash values and the coincidence between the studio IDs and package IDs. In contrast, to use the content set in a directory 853, the checking of hash values is not necessary.

The usage conditions for content stored in a local storage can be set by combining the three factors, i.e., (A) checking of hash values, (B) coincidence of studio IDs, and (C) coincidence of package IDs, in various manners. For example, the following combinations can be considered:

(Condition 1) checking all factors (A), (B), and (C)
(Condition 2) checking only two factors (A) and (B)
(Condition 3) checking only two factors (A) and (C)
(Condition 4) checking only two factors (B) and (C)
(Condition 5) checking only one factor (A)
(Condition 6) checking only one factor (B)
(Condition 7) checking only one factor (C)
(Condition 8) none of the factors (A), (B), and (C) is checked.

Figure 30:
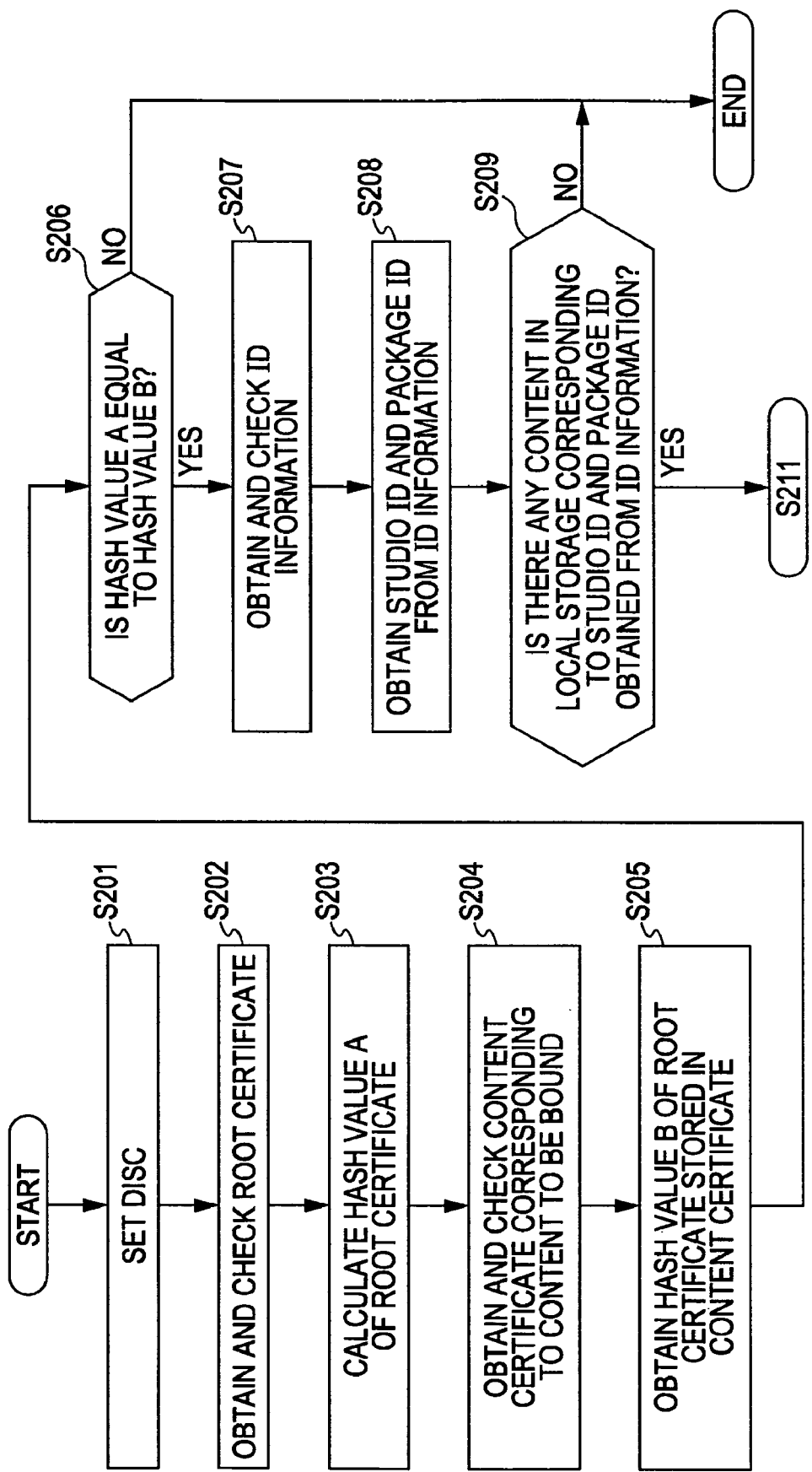
FIGS. 30 and 31 are flowcharts illustrating a usage control processing sequence for content stored in a local storage by using a content certificate and a root certificate.
Figure 31:
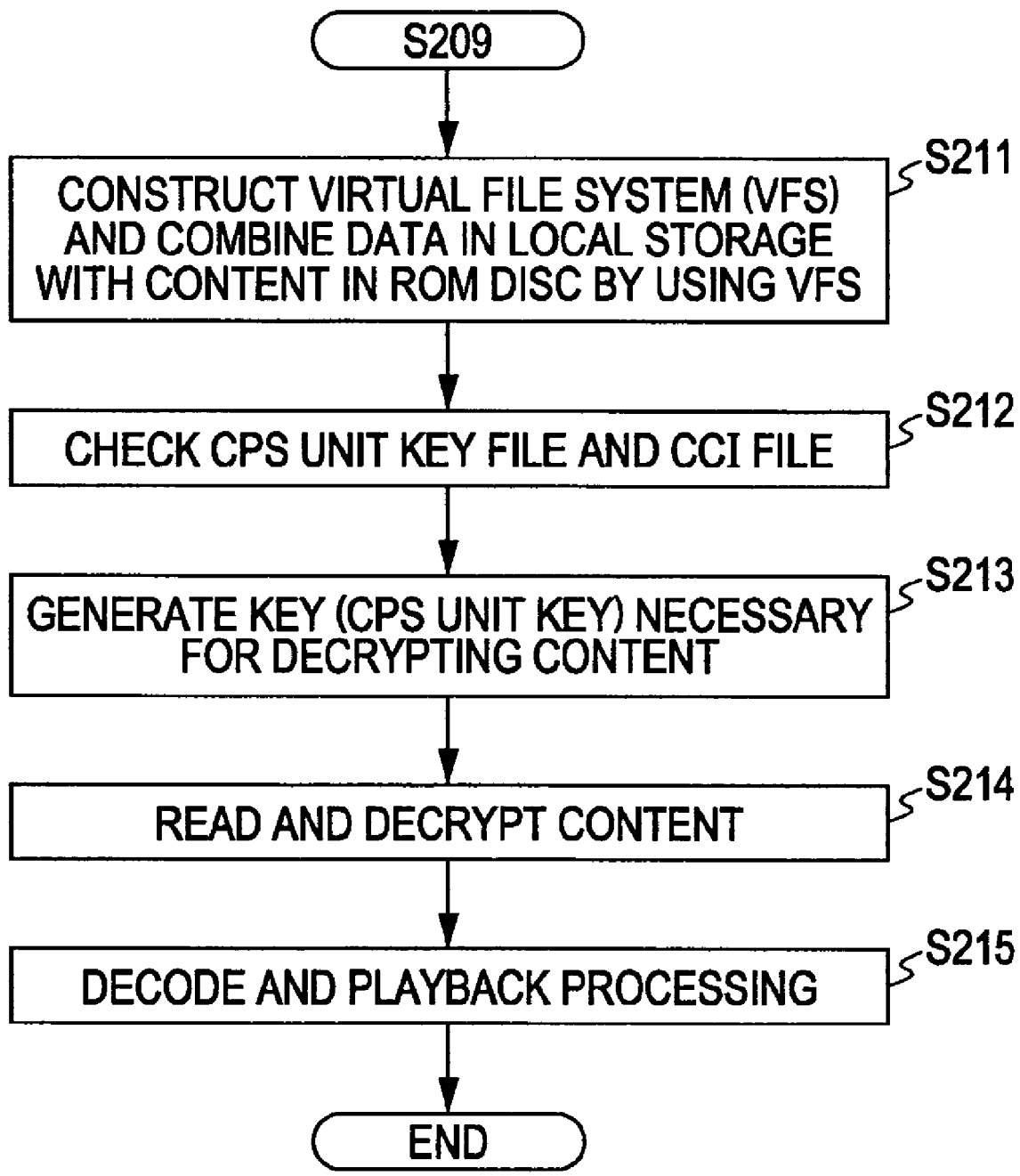

A description is given below, with reference to FIGS. 30 and 31, of a sequence for the use of content stored in a local storage by an information processing apparatus. The sequence shown in FIGS. 30 and 31 is performed when condition 1, i.e., all factors (A), (B), and (C) are checked, is employed. This processing is performed by a playback application executed by a data processor (controller, for example, a CPU) of the information processing apparatus provided with a disc drive.

In step S201, a disc on which content is recorded is set in the information processing apparatus. Then, in step S202, a root certificate is read from the disc and tamper-checking and verification processing using a signature is performed on the read root certificate. The root certificate is, as discussed with reference to FIG. 23, data set in the certificate directory. If the integrity of the root certificate is not verified, the processing is terminated, though an indication of this step is omitted in the flowchart. If the integrity of the root certificate is verified, in step S203, a hash value is calculated on the basis of the root certificate. The calculated hash value is set to be hash value A.

Then, in step S204, a content certificate corresponding to content stored in the disc to be bound with data stored in a local storage is read from the disc, and tamper-checking and verification processing using a signature is performed on the read content certificate. The content certificate is, as discussed with reference to FIG. 23, data set in the certificate directory, and stores the hash value of the root certificate, as discussed with reference to FIG. 24. If the integrity of the content certificate is not verified, the processing is terminated, though an indication of this step is omitted in the flowchart. If the integrity of the content certificate is verified, in step S205, the hash value of the root certificate is obtained from the content certificate. The obtained hash value is set to be hash value B.

It is then determined in step S206 whether the hash value A calculated from the root certificate coincides with the hash value B obtained from the content certificate. If the two hash values do not coincide with each other, it is determined that at least one of the root certificate and the content certificate is unauthorized data, such as that illegally copied from another disc, and thus, the processing is terminated. That is, the use of the content is discontinued.

If it is determined in step S206 that the two hash values are equal to each other, the process proceeds to step S207 to obtain ID information from the disc. The ID information is, as discussed with reference to FIG. 23, data set in the certificate directory, in which the studio ID and the package ID are recorded, as discussed with reference to FIG. 26, with a signature. If the integrity of the ID information is not verified, the processing is terminated, though an indication of this step is omitted in the flowchart. If the integrity of the ID information is verified, in step S208, the studio ID and the package ID are obtained from the ID information.

Then, in step S209, it is determined whether there is any content in the local storage corresponding to the studio ID and the package ID obtained from the ID information, i.e., whether there is data in the local storage to be bound with data corresponding to the studio ID and the package ID. If there is no such data, the processing is terminated. That is, the use of the content is discontinued.

If such data is found in step S209, the process proceeds to step S211. In step S211, a subsequently generated/obtained data file to be played back is selected and is combined with a file stored in the recording medium in a virtual manner so that a virtual file system (VFS) is constructed.

When constructing this virtual file system, if a file name conversion table is recorded in a subsequently generated/obtained data search information file and the file name of the subsequently generated/obtained data file is registered in the file name conversion table, the file name conversion is performed on the basis of the file name conversion table.

The virtual file system is generated such that a data file stored in the recording medium is combined with a related file in the local storage in one virtual directory. This enables fast access to files stored in different recording media.

Then, in step S212, a CPS unit key file and content usage control information (CCI) are checked so that a CPS unit key corresponding to a CPS unit to be played back can be obtained.

Then, in step S213, a key used for decrypting content, i.e., the CPS unit key for decrypting the CPS unit, is generated. In step S214, data stored in the disc, such as a DVD, and data stored in the local storage, such as a hard disk, are read and decrypted by using the virtual file system. Then, in step S215, the content is decoded and played back.

8. Example of Configuration of Information Processing Apparatus

Figure 32:
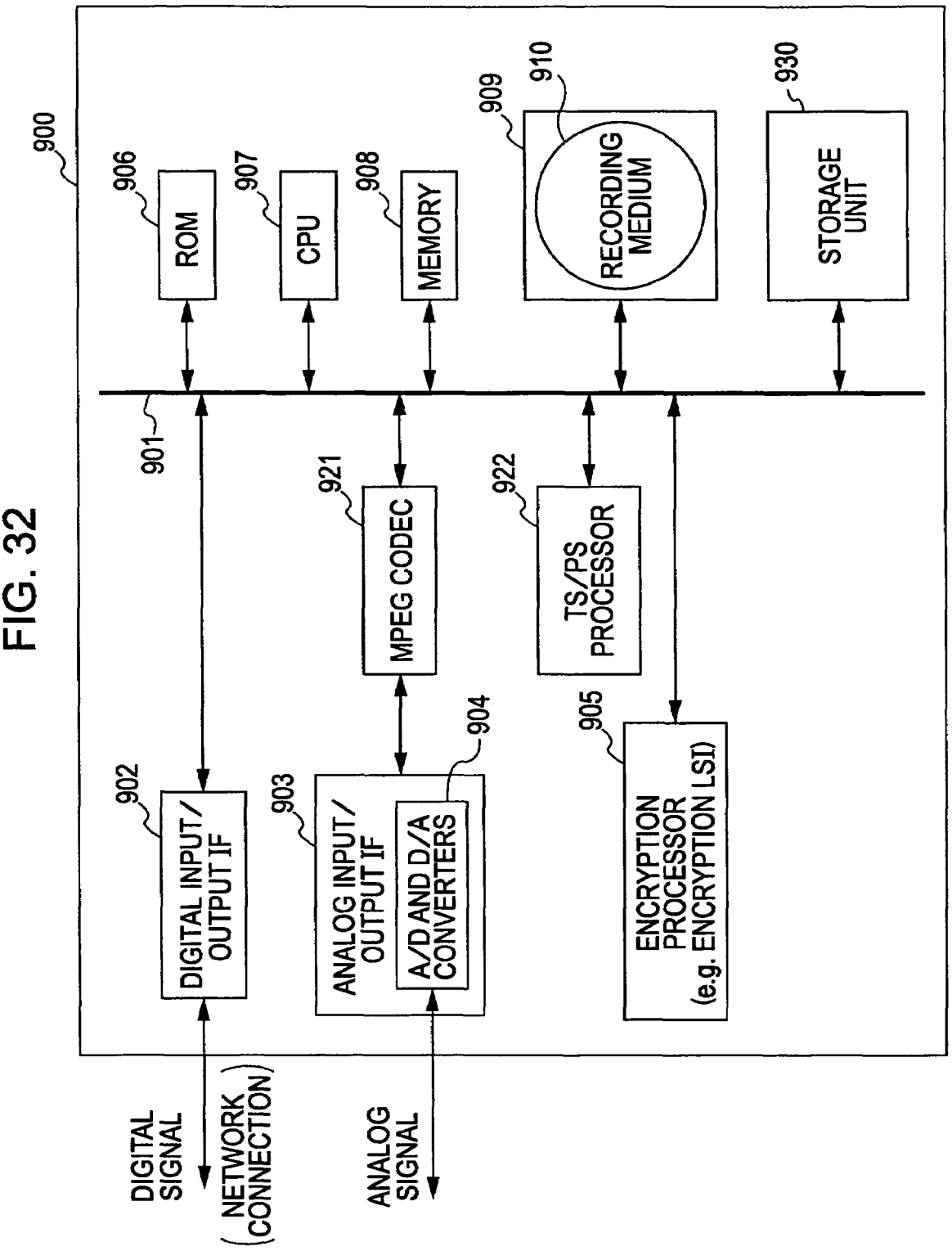
FIG. 32 illustrates an example of the configuration of an information processing apparatus that performs recording or playback processing by installing an information recording medium therein.

An example of the configuration of an information processing apparatus 900 that records or plays back data on or from information recording media storing CPS-unit content is described below with reference to FIG. 32.

The information processing apparatus 900 includes a drive 909 for driving an information recording medium 910 to input or output data recording/playback signals, a CPU 907, which serves as a controller for performing data processing according to various programs, a ROM 906, which serves as a storage area for programs and parameters, a memory 908, a digital input/output interface (IF) 902 for inputting or outputting digital signals, an analog input/output interface (IF) 903, which includes analog-to-digital (AD) and digital-to-analog (DA) converters 904, for inputting or outputting analog signals, an MPEG codec 921 for encoding or decoding MPEG data, a transport-stream/program-stream (TS/PS) processor 922 for executing TS/PS processing, an encryption processor 905 for executing various encryption processing operations, and a storage unit 930, such as a hard disk. The above-described blocks are connected to a bus 901.

In the information processing apparatus 900 configured as described above, when playing back AV stream data of MPEG-TS data from the information recording medium 910, the data read from the information recording medium 910 is first decrypted in the encryption processor 905 if necessary. Then, the data is demultiplexed into video, audio, and subtitle data in the TS/PS processor 922.

Digital data decoded in the MPEG codec 921 is converted into an analog signal in the DA converter 904 of the analog input/output interface 903 and is output. If a digital data is output, the MPEG-TS data decrypted in the decryption processor 905 is output via the digital input/output interface 902 as the digital data. In this case, the digital data is output to a digital interface, such as an IEEE1394 interface, an Ethernet cable, or a wireless local area network (LAN). If data is output via a network, the digital input/output interface 902 has a network connecting function.

If the information processing apparatus 900 converts data into a format that can be received by a destination device, the video, audio, and subtitle data demultiplexed in the TS/PS processor 922 are subjected to rate conversion and codec conversion in the MPEG codec 921, and are again multiplexed into MPEG-TS or MPEG-PS data in the TS/PS processor 922. Then, the multiplexed data is output from the digital input/output interface 902. In this case, the video, audio, and subtitle data may be coded and converted into a multiplexed file in the format other than MPEG under the control of the CPU 907, and is then output from the digital input/output interface 902.

The CPS unit management table (see FIG. 2), which serves as the CPS unit management information, and management data, such as playback/copy control information for each CPS unit, are read from the information recording medium 910 and are then stored in the memory 908. Key information necessary for playing back a CPS unit can be obtained from the data stored in the memory 908.

In the storage unit 930, such as a hard disk, data generated or obtained by the information processing apparatus 900 is recorded. Such subsequently generated/obtained data is searched for by the use of subsequently generated/obtained data search information stored in the storage unit 930, and only subsequently generated/obtained data that is allowed to be accessed by the information processing apparatus 900 in accordance with access control information stored in the storage unit 930 is obtained. Then, a virtual file system is constructed by the above-described merge processing, and the obtained subsequently generated/obtained data is played back together with content read from the recording medium 910.

The operation for recording subsequently generated/obtained data by the information processing apparatus 900 is as follows. Two cases can be considered where data to be recorded is input as a digital signal and an analog signal. If a digital signal is input, it is input via the digital signal input/output interface 902 and is then encrypted in the encryption processor 905 if necessary, and is then stored in the information recording medium 910 or the storage unit 930. The storage unit 930 also stores subsequently generated/obtained data search information and access control information.

If the input digital signal is stored after converting its data format, the data format of the digital signal is converted by the MPEG codec 921, the CPU 907, and the TS/PS processor 922, and then, the resulting digital signal is encrypted in the encryption processor 905 and is stored in the recording medium 910.

If the input signal is an analog signal, it is input via the analog input/output interface 903 and is converted into a digital signal by the AD converter 904. The digital signal is then converted by the MPEG codec 921 into a codec that is used when being recorded.

Then, the codec is converted into AV multiplexed data, which is a recording data format, by the TS/PS processor 922, and is encrypted by the encryption processor 905 if necessary. The resulting data is then stored in the information recording medium 910. The subsequently generated/obtained data search information and access control information are also stored in the storage unit 930.

If necessary information is obtained from an external source via a network by the information processing apparatus 900, it is stored in the memory 908. Such information includes key information necessary for playing back content, data to be played back together with the content, such as subtitle, audio, and still image data, content management information, and operation rules (usage rules) applied to a playback device in accordance with the content management information.

Subsequently generated/obtained data is temporarily stored in the memory 908, and is then stored in the storage unit 930, such as a hard disk, by a user selection or in accordance with a predetermined control sequence.

The program for executing playback or recording processing is stored in the ROM 906, and, if necessary, the memory 908 is used for storing data and parameters or as a work area while executing the program. The information processing apparatus 900 shown in FIG. 32 is a device that can perform both recording and playback operations. However, a device having only a recording function or a playback function can also be used.

A series of processing operations described in the specification may be executed by hardware, software, or a combination thereof. If software is used, a program containing a processing sequence can be installed into a memory of a computer built in dedicated hardware or into a general-purpose computer that can execute various processing operations.

The program can be prerecorded in a recording medium, such as a hard disk or a ROM. The program can also be recorded (stored) temporarily or permanently in a removable recording medium, such as a flexible disk, a CD-ROM, a magneto-optical (MO) disk, a DVD, a magnetic disk, or a semiconductor memory. Such a removable recording medium can be provided as so-called "package software".

Instead of being installed into a computer from the above-described removable recording medium, the program may be transferred wirelessly to the computer from a download site, or by wired means, such as a network, for example, a LAN or the Internet. The computer receives the program and installs it in a recording medium, such as a built-in hard disk.

The various processing operations may be executed in chronological order as described in the specification. Alternatively, they may be executed in parallel or individually according to the performance of a device that performs processing or according to the necessity. In this specification, the system is a logical set of a plurality of devices, and it is not necessary that the devices be in the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
    a data processor configured to obtain first content stored in a first information recording medium and second content which is stored in a second information recording medium and which is usable together with the first content, and to perform content playback processing by using the first content and the second content,
    wherein the data processor calculates a hash value of a certificate stored in the first information recording medium, and verifies the calculated hash value against a hash value stored in a content certificate corresponding to the first content, and if the calculated hash value and the hash value stored in the content certificate coincide with each other, the data processor performs the content playback processing by using the first content and the second content,
    wherein the data processor further obtains identification information recorded in the first information recording medium, and obtains, as the second content, content that is usable in association with the identification information from the second information recording medium to perform the content playback processing by using the first content and the second content,
    wherein the data processor constructs a virtual file system when performing the playback processing by using the first content and the second content, and the identification information is recorded, as a single file, in a directory in the first information recording medium which is not included when constructing the virtual file system, and the identification information is obtained from the first recording medium.

2. The information processing apparatus according to claim 1, wherein the data processor verifies a signature attached to the content certificate, and on the condition that the integrity of the content certificate is verified on the basis of the signature, the data processor obtains the hash value stored in the content certificate to verify the calculated hash value against the obtained hash value.

3. The information processing apparatus according to claim 1, wherein the data processor obtains a public key certificate as the certificate stored in the first information recording medium, and calculates the hash value of the public key certificate to verify the calculated hash value against the hash value stored in the content certificate corresponding to the first content, and on the condition that the calculated hash value and the stored hash value coincide with each other, the data processor performs the content playback processing.

4. The information processing apparatus according to claim 3, wherein the public key certificate stores a public key for verifying a signature set in the first content stored in the first information recording medium.

5. The information processing apparatus according to claim 1, wherein the identification information comprises at least one of a studio ID, which serves as identification information concerning a production entity of the first content stored in the first information recording medium, and a disc ID, which serves as identification information concerning the first information recording medium.

6. The information processing apparatus according to claim 1, wherein the data processor verifies a tamper-checking signature set in association with the identification information to verify integrity of a data file of the identification information.

7. An information processing method for an information processing apparatus, comprising:
    calculating a hash value of a certificate stored in a first information recording medium and verifying the calculated hash value against a hash value stored in a content certificate corresponding to first content stored in the first information recording medium; and
    if the calculated hash value and the hash value stored in the content certificate coincide with each other, obtaining the first content stored in the first information recording medium and second content which is stored in a second information recording medium and which is usable together with the first content, and performing content playback processing by using the first content and the second content, wherein, when performing the content playback processing, identification information recorded in the first information recording medium is obtained from the first information recording medium, and content that is usable in association with the identification information is obtained as the second content from the second information recording medium so that the content playback processing is performed by using the first content and the second content, wherein the information processing apparatus constructs a virtual file system when performing the playback processing by using the first content and the second content, and the identification information is recorded, as a single file, in a directory in the first information recording medium which is not included when constructing the virtual file system, and the identification information is obtained from the first recording medium.

8. The information processing method according to claim 7, wherein, when verifying the calculated hash value against the stored hash value, a signature attached to the content certificate is verified, and on the condition that the integrity of the content certificate is verified on the basis of the signature, the hash value stored in the content certificate is obtained, and the calculated hash value is verified against the obtained hash value.

9. The information processing method according to claim 7, wherein, when verifying the calculated hash value against the stored hash value, a public key certificate is obtained as the certificate stored in the first information recording medium, and the hash value of the public key certificate is calculated, and the calculated hash value is verified against the hash value stored in the content certificate corresponding to the first content.

10. The information processing method according to claim 9, wherein the public key certificate stores a public key for verifying a signature set in the first content stored in the first information recording medium.

11. The information processing method according to claim 7, wherein the identification information includes at least one of a studio ID, which serves as identification information concerning a production entity of the first content stored in the first information recording medium, and a disc ID, which serves as identification information concerning the first information recording medium.

12. The information processing method according to claim 7, further comprising verifying a tamper-checking signature set in association with the identification information to verify the integrity of a data file of the identification information.

13. A computer readable storage medium having stored thereon computer program code, which, when executed, causes an information processing apparatus to perform content playback control processing comprising:

calculating a hash value of a certificate stored in a first information recording medium and verifying the calculated hash value against a hash value stored in a content certificate corresponding to first content stored in the first information recording medium; and on the condition tat the calculated hash value and the hash value stored in the content certificate coincide wit each other, obtaining the first content stored in the first information recording medium and second content which is stored in a second information recording medium and which is usable together with the first content, and performing content playback processing by using the first content and the second content, wherein, when performing the content playback processing, identification information recorded in the first information recording medium or in the first content is obtained from the first information recording medium, and content that is usable in association with the identification information is obtained as the second content from the second information recording medium so that the content playback processing is performed by using the first content and the second content, wherein the information processing apparatus constructs a virtual file system when performing the playback processing by using the first content and the second content, and the identification information is recorded, as a single file, in a directory in the first information recording medium which is not included when constructing the virtual file system, and the identification information is obtained from the first recording medium.

* * * * *